(12) United States Patent
Shefi

(10) Patent No.: US 9,396,578 B2
(45) Date of Patent: Jul. 19, 2016

(54) METHOD AND SYSTEM FOR DISPLAYING VISUAL CONTENT IN A VIRTUAL THREE-DIMENSIONAL SPACE

(71) Applicant: Yoav Shefi, Tel Aviv, IL (US)

(72) Inventor: Yoav Shefi, Tel Aviv, IL (US)

( * ) Notice: Subject to any disclaimer, the term of this patent is extended or adjusted under 35 U.S.C. 154(b) by 0 days.

(21) Appl. No.: 14/459,700

(22) Filed: Aug. 14, 2014

(65) Prior Publication Data

US 2015/0187121 A1   Jul. 2, 2015

Related U.S. Application Data

(63) Continuation of application No. 13/238,811, filed on Sep. 21, 2011, now abandoned, which is a continuation of application No. 10/152,066, filed on May 22, 2002, now Pat. No. 8,035,635.

(60) Provisional application No. 60/293,370, filed on May 22, 2001.

(51) Int. Cl.
| | |
|---|---|
| *G06T 15/20* | (2011.01) |
| *G06T 11/20* | (2006.01) |
| *G06T 11/60* | (2006.01) |
| *G06T 17/00* | (2006.01) |
| *G06Q 30/02* | (2012.01) |

(52) U.S. Cl.
CPC .......... *G06T 15/205* (2013.01); *G06Q 30/0241* (2013.01); *G06T 11/206* (2013.01); *G06T 11/60* (2013.01); *G06T 15/20* (2013.01); *G06T 17/00* (2013.01); *G06T 2200/24* (2013.01)

(58) Field of Classification Search
None
See application file for complete search history.

(56) References Cited

U.S. PATENT DOCUMENTS

| | | |
|---|---|---|
| 5,276,793 A | 1/1994 | Borgendale et al. |
| 5,341,466 A | 8/1994 | Perlin et al. |
| 5,634,064 A | 5/1997 | Warnock et al. |

(Continued)

FOREIGN PATENT DOCUMENTS

| | | |
|---|---|---|
| EP | 1 014 257 A1 | 6/2000 |
| EP | 1 093 090 A1 | 4/2001 |

(Continued)

OTHER PUBLICATIONS

G. Robertson et al., "The Task Gallery: A 3D Window Manager", Microsoft Research, Redmond, WA.

(Continued)

*Primary Examiner* — Said Broome
(74) *Attorney, Agent, or Firm* — Browdy and Neimark, PLLC

(57) ABSTRACT

A system and system for positioning content elements in a virtual 3D space. A 2D base plane is designated in the 3D space, and the visual content is positioned in the 3D space with at least one page being parallel to the base plane. A viewpoint and a viewing ray are selected in the 3D space from which to view the 3D space with the viewing ray being neither parallel nor perpendicular to the base plane. A 2D surface is then positioned in the 3D space so that the 2D surface intersects the view ray between the viewpoint and the base plane. At least a portion of the 3D space is then projected onto the 2D surface by a perspective projection determined by the viewing ray. The process may be repeated as desired each time optionally selecting a new viewpoint and/or selecting a new viewing ray and/or altering a property of one or more content elements. The projection onto the viewing surface may be displayed on a display device such as a computer monitor.

67 Claims, 40 Drawing Sheets

(56) References Cited

U.S. PATENT DOCUMENTS

| | | | |
|---|---|---|---|
| 5,671,381 A | | 9/1997 | Strasnick |
| 5,689,287 A | | 11/1997 | Mackinlay et al. |
| 5,689,628 A | * | 11/1997 | Robertson ............... 345/427 |
| 5,798,761 A | * | 8/1998 | Isaacs ................... 345/419 |
| 6,011,905 A | | 1/2000 | Huttenlocher et al. |
| 6,175,843 B1 | | 1/2001 | Muramoto et al. |
| 6,222,547 B1 | | 4/2001 | Schwuttke et al. |
| 6,226,009 B1 | | 5/2001 | Carraro et al. |
| 6,329,994 B1 | | 12/2001 | Gever et al. |
| 6,331,861 B1 | * | 12/2001 | Gever et al. ............. 345/629 |
| 6,577,330 B1 | | 6/2003 | Tsuda et al. |
| 6,650,343 B1 | | 11/2003 | Fujita et al. |
| 6,938,218 B1 | | 8/2005 | Rosen |
| 2002/0135538 A1 | * | 9/2002 | Rosen ..................... 345/1.1 |
| 2003/0197737 A1 | * | 10/2003 | Kim ....................... 345/781 |

FOREIGN PATENT DOCUMENTS

| | | |
|---|---|---|
| JP | 11-65806 A | 3/1999 |
| JP | 11-85432 A | 3/1999 |
| JP | 2000-137563 A | 5/2000 |
| JP | 2000-172248 A | 6/2000 |
| JP | 2000-512039 A | 9/2000 |
| WO | 98/01824 A1 | 1/1998 |

OTHER PUBLICATIONS

G. Robertson et al., "Data Mountain: Using Spatial Memory for Document Management", Microsoft Research, Redmond, WA, 1998.

P. Hetzel, "Step Into You New Browser", Mar. 5, 2001, An MIT Enterprise Technology Review, obtained from the Internet on Mar. 31, 2002, file://\\Elgotfrid-co\1\New%20Prior%20art%20research\Step%20Into%20Your%20New% . . . .

J. S Pierce et al., "Toolspaces and Glances: Storing, Accessing, and Retrieving Objects in 3D Desktop Applications", Microsoft Research.

Maarten Van Dantzirh et al., "Application Redirection: Hosting Windows Application in 3D"; 1999, pp. 87-91, ACM, NY.

James D. Foley et al., "Computer Graphics, Principles and Practices, Second Edition in C", Addison-Wesley Publishing Co., Boston, USA, pp. 229-242, 1996.

Carlbom et al., "Planar Geometric Projections and Viewing Transformations", Computing Surveys, vol. 10, No. 4, Dec. 1978.

\* cited by examiner

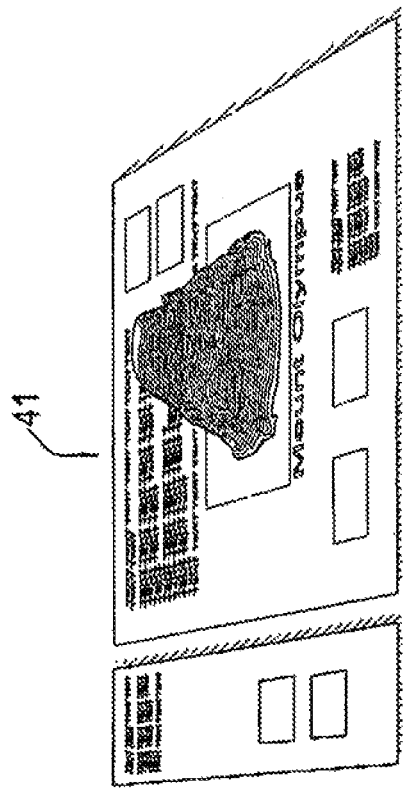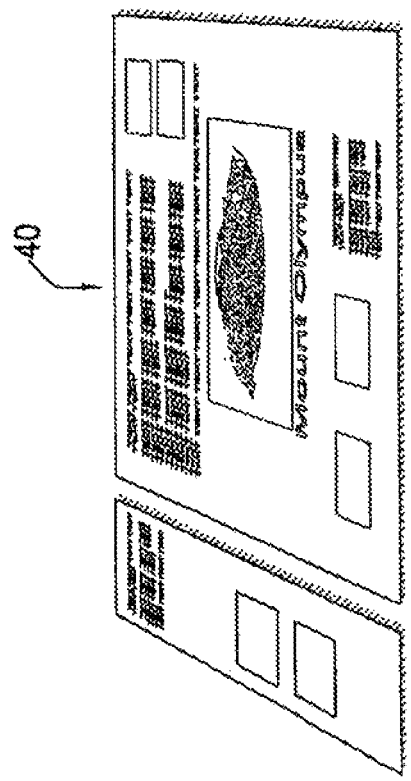
FIG. 4B

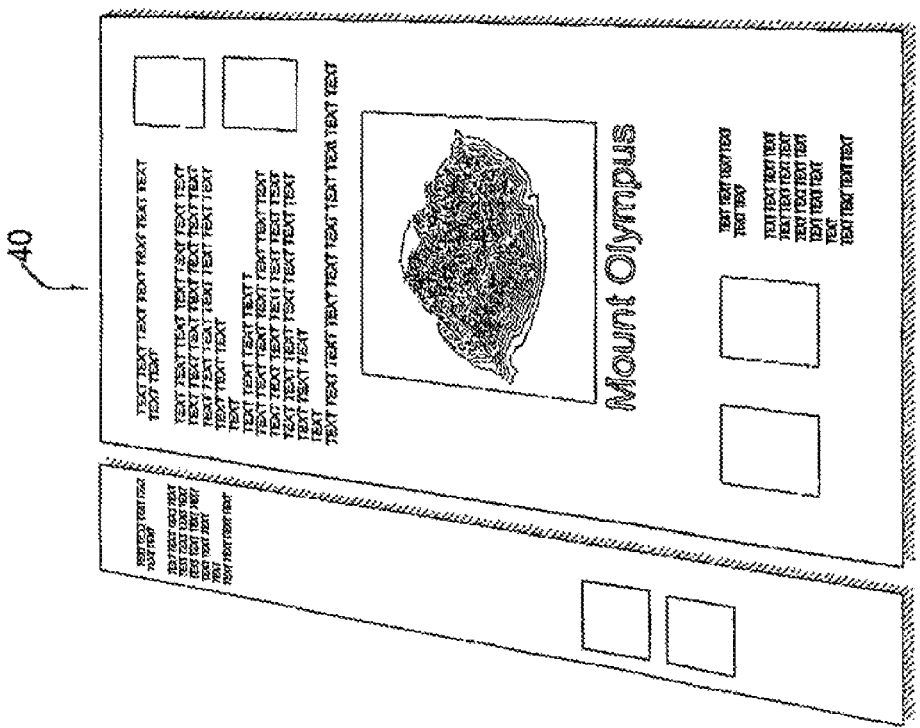
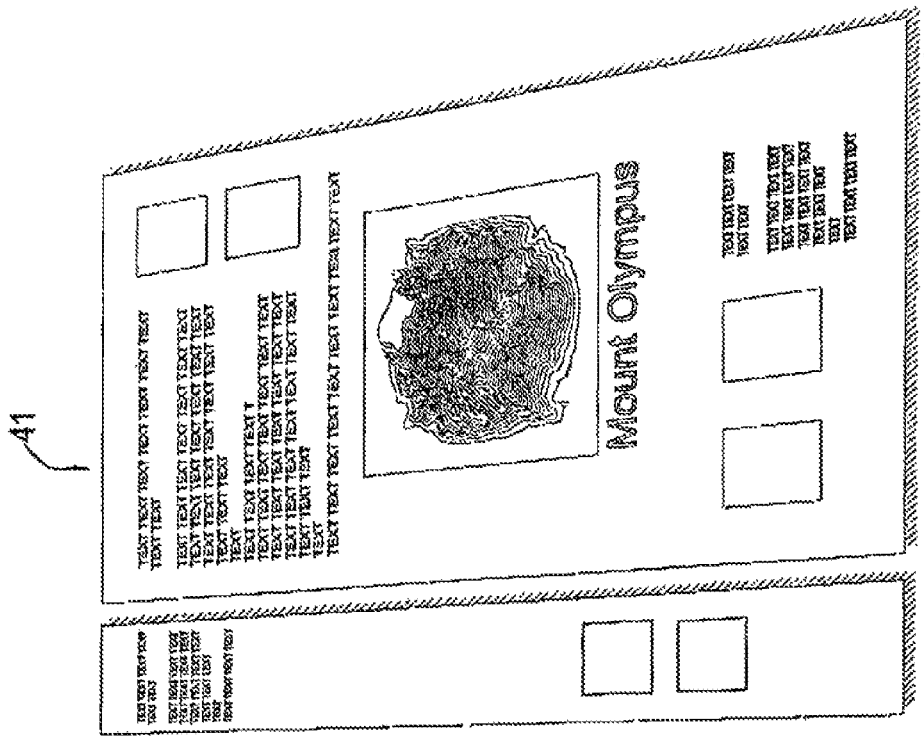
FIG. 4C

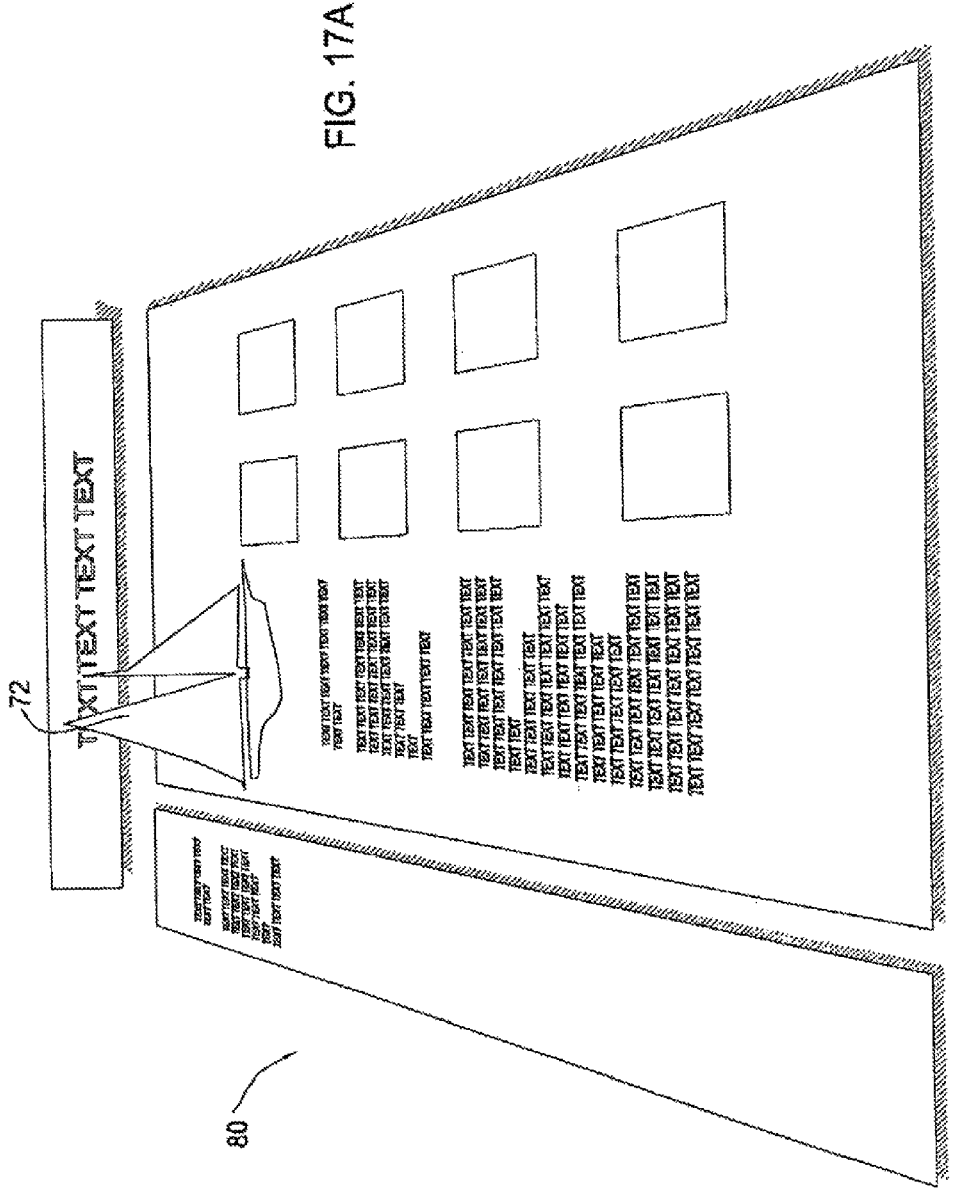

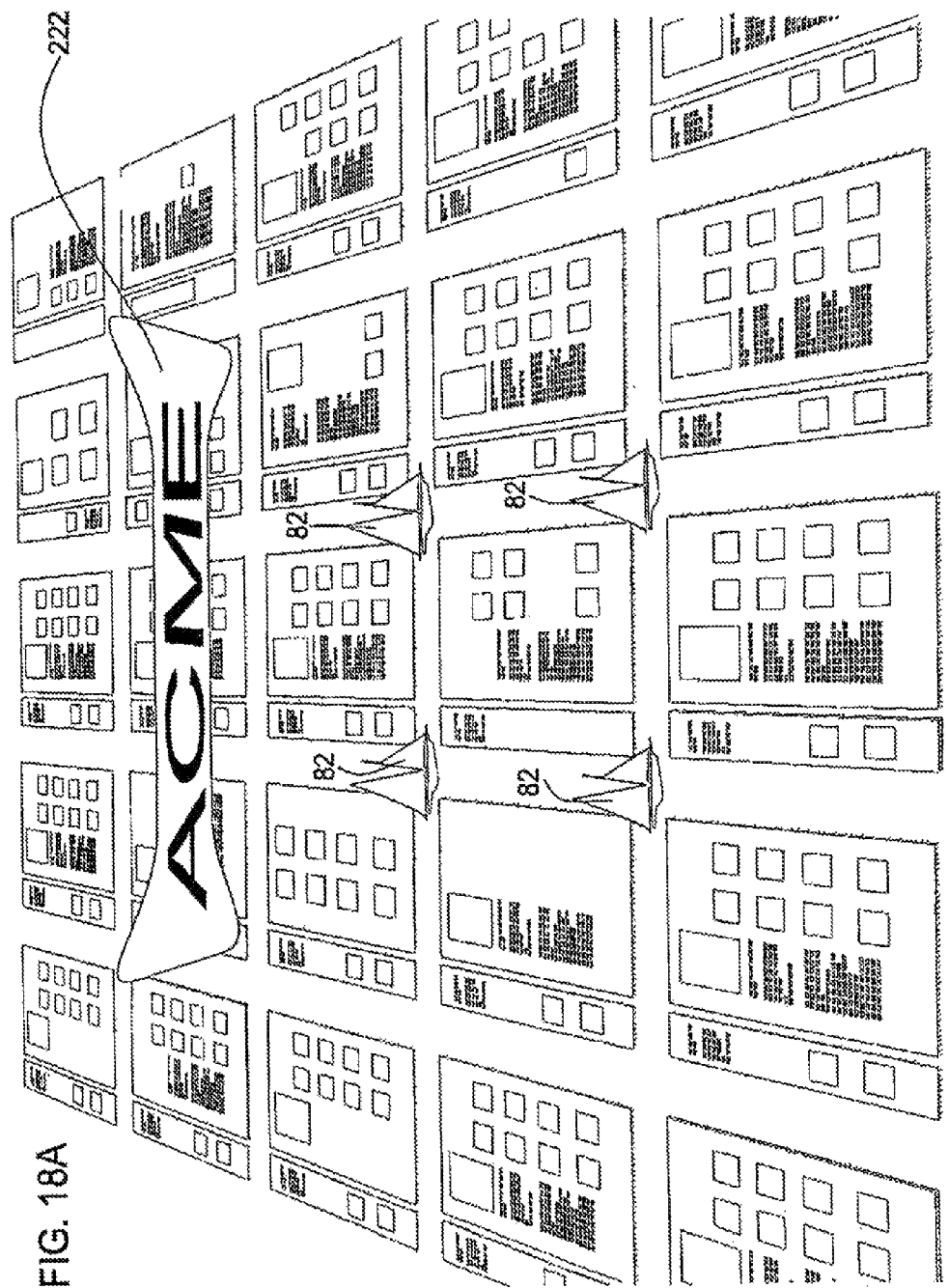

METHOD AND SYSTEM FOR DISPLAYING VISUAL CONTENT IN A VIRTUAL THREE-DIMENSIONAL SPACE

CROSS REFERENCE TO RELATED APPLICATIONS

This application is a continuation application of application Ser. No. 13/238,811, filed Sep. 21, 2011, which is a continuation application of application Ser. No. 10/152,066, filed May 22, 2002, which claims the benefit of U.S. Provisional Application 60/293,370 filed May 22, 2001.

FIELD OF THE INVENTION

This invention relates to methods for displaying visual content on a screen.

BACKGROUND OF THE INVENTION

Computer screens and other two-dimensional (2D) surfaces are commonly used for displaying 2D visual content such as a page of text, a diagram or a Web site page. Some forms of visual content contain two or more content forms, such as a page consisting of text and diagrams, or a Web site page containing information related to the site and unrelated advertising. Usually, only one page is displayed on a screen at a time and the page is confined to the boundaries of the screen. The different elements in a page must therefore compete with each other for space and the viewer's attention, even if they are related to each other. Existing Web site pages are therefore generally overcrowded by advertising and this is the major reason why Web advertising is presently considered ineffective.

Changing a displayed page (known as browsing or navigating) is a discontinuous process wherein an initially displayed page is removed from the screen and a second page is subsequently displayed. The ability to view only one page at a time makes it difficult for a viewer to know his location at a website and also creates uncertainty while navigating through the site. Changes in the size of a page is also done in discrete steps, and a return to the browser is required for each step change.

It is also known to arrange several pages in a virtual three-dimensional (3D) space and projecting a portion of the 3D space onto the 2D screen. A viewer may continuously navigate from page to page.

Robertson et al (Data Mountain: using Spatial memory for document Management) disclose a method for document management which allows users to place documents at arbitrary positions on an inclined plane in a 3D desktop virtual environment using a 2D interaction technique. The pages are all viewed en face (perpendicular to the user's perspective). Robertson et al (Task Gallery: a 3D Window Manager) disclose a method for task management and document comparison. Application windows appear unaltered as artwork hung on the walls of a virtual art gallery, with a selected task on a back wall. The perspective from which the gallery is viewed is perpendicular to the back wall of the gallery, so that documents hung on the back wall are viewed en face, while documents on the side walls, floor and ceiling are parallel to the user's perspective. Multiple documents can be selected and displayed side-by side using 3D space to provide uniform and scaling.

SUMMARY OF THE INVENTION

As used herein the term "page" refers to a two-dimensional array of two or more visual "content elements". A page is typically, although not necessarily, rectangular in shape. A page has a top edge, a bottom edge and left and right side edges. A content element may be 2D (such as text, a diagram, or a 2D picture including 2D pictures of 3D objects such as a mountain). A visual content element may also be volumetric 3D (such as a virtual mountain). A volumetric 3D content element projects volumetrically out of the page. The content elements in a page may be of the same or of different type, such as a page consisting of textual material, a diagram and volumetric 3D figure. In the case of a page containing text, the text is normally read from the top edge to the bottom edge. A page has an associated "layout" that specifies the relative position of the different content elements in the page. For example, the layout may specify that a particular content element in a page is located at the top of the page, or is located to the left of another specific content element. The term "document" refers to a collection of one or more pages. A document may be, for example, pages of textual material, web site pages, a directory, operating system folders, search query results, Adobe™ or PDF elements, their content elements, bitmap images, buttons, etc. A document page may thus be, for example, a page of textual material, a website page, or a window. A window is a specialized page designed to contain as a content element a view of another page. An application interface window is a window containing, in addition to a view of another page, a layout of content elements each representing one or more of the application functions, or a link to another window.

In its first aspect, the present invention provides a method for arranging pages and content elements in a three-dimensional (3D) space and projecting a portion of the 3D space onto a 2D surface (referred to herein as the "viewing surface") positioned in the 3D space. A plane is designated in the 3D space referred to herein as the "base plane". Visual content consisting of a page and at least one other page or a content element is positioned in the 3D space with at least one page positioned in the base plane. A virtual viewpoint and a viewing ray having a vertex at the viewpoint are selected from which to view a portion of the 3D space, including a portion of the base plane. In accordance with this aspect of the invention, the viewing ray is not parallel or perpendicular to the base plane. Once the viewing ray has been selected, the viewing surface is positioned in the 3D space so that it intersects the viewing ray at a predetermined distance from the viewpoint. The viewing surface is preferably planar and is preferably positioned perpendicular to the viewing ray. In this case, since the viewing ray is neither parallel nor perpendicular to the base plane, the viewing surface is also neither parallel nor perpendicular to the base plane. The viewing surface, however, may have any shape such as a portion of a spherical surface or a portion of a cylindrical surface. The viewpoint and viewing surface define a pyramid consisting of the set of rays having the viewpoint as vertex and passing through a point on the edge of the viewing surface. The portion of the 3D space located in the frustum of the pyramid determined by the viewing surface (referred to herein as the "viewing space") is perceptively projected onto the viewing surface.

In a preferred embodiment, the projection of the 3D space on the viewing surface is displayed on a display device such as a computer screen, television or a head mounted display for stereo viewing. Alternatively, the projection of the viewing surface may be projected onto a second 2D surface and this projection displayed on a display device. A user selects the viewpoint and view ray using a computer input device such as a computer mouse, keyboard, joystick, or remote control.

The pages positioned in the base plane are preferably spaced apart from one another so that a portion of the base plane is visible between adjacent pages. The portion of the base plane between two adjacent pages is referred to as "white space". The presence of white space between pages allows a page's content elements to be repositioned, at least partially, in the white space without obscuring other pages. In a preferred embodiment, a page's content elements are repositioned while preserving the page's layout. A repositioning of a page's content elements that preserves the page's layout is one satisfying the following conditions:

(One) The repositioning does not cause non-overlapping content elements to overlap in the base plane.

(Two) The repositioning does not switch lateral or vertical order.

(Three) Marking a graph connecting the center of each element to the centers of adjacent elements, the repositioning does not change the relationships of the angles in the graph.

For example, if the layout specifies that a particular content element is positioned at the top of the page, that content element may be moved in the base plane in the z direction into the white space above the page's top so that it remains above the page's other content elements, but separated from them by a greater distance than previously. As another example, if the layout specifies that a first content element is to be positioned to the left of a second content element, the first content element may be moved in the base plane into the white space to the left of the page's left side so that it remains to the left of the second content element, but separated from it at a greater distance than previously. As yet another example of repositioning a page's content elements while preserving the page's layout, one or more of the content elements may be lifted above the base plane in the 3D space. As still another example, if the layout specifies that a particular content element is located in the lower right corner, the content element may be repositioned in the white space below and to the right of the page. Rotating a content element in the page (without translating it) also preserves the layout as does rotating a content element out of the base plane so that it projects into the 3D space at an angle from the base plane.

Additional content elements may also be positioned in the white space between pages. For example, the white space may be used for advertising. In this way the advertising does not compete for space with page content elements. Newly created or familiar character figures can also be positioned in the white space and used as accessories to act as guides, advertising spokesmen, or as a teaching tool. As the user approaches, the character's behavior may increase in complexity. The white space may also be used to receive information and to display it near a document asynchronously of the document, while not disturbing the document's contents or its layout.

A wide-browsing mode is created by placing a plurality of pages in the base plane with the pages preferably all positioned with the same orientation and at a predetermined separation between documents. Neighboring pages in the array of pages may be, for example, consecutive pages in a document. This creates empty space between the pages that may be utilized, for example, for auxiliary additional content resources, such as advertising, which can be positioned around a page or above it, possibly in 3D, and without competing for space with the page's own contents. The auxiliary resources may be hidden within a page or stream asynchronously from an independent source to a designated location in the 3D space.

In addition to the base plane, one or more additional planes may be designated in the 3D space parallel to the base plane so that the viewing ray intersects all of the planes. Content elements or pages are positioned in the planes, and the user may alternate his browsing between the planes as desired;

positioning one or more pages or content elements in the second plane;

In its second aspect, the invention provides a method for navigating through the displayed visual content. Using a computer input device, the user may change the viewpoint and view ray. The perspective may be changed continuously (for example 20 to 30 times per second). Continuously changing the perspective creates an effect of smooth gliding through the 3D space over the base plane. Placing related pages side by side allows a user to view a complete document in one window by gliding from one page to the next. The user may zoom into a page for closer inspection, or zoom out from a page. Content elements or pages positioned in the 3D space may be stored in a memory together with their locations in the 3D space, transmitted to a remote location.

The base plane can be made virtually infinite by continuously generating in real time new coordinates in the base plane as the viewer brings different portions of the 3D space into view, and by positioning additional content elements in the base plane as new regions come into view.

Interactivity may be enhanced by content elements that perform a response when the viewpoint or the viewing ray satisfies a predetermined condition. The response may be initiated by passing by a particular content element, approaching a content element, withdrawing from it, or lingering near it for more than a predetermined amount of time.

In its third aspect, the invention provides a system for carrying out the method of the invention. The system consists of a computer processing unit (CPU). The CPU is configured to run a software that executes steps of positioning visual content in a virtual 3D space and projecting the 3D space onto a 2D viewing surface positioned in the 3D space, in accordance with the method of the invention. The software includes a view window of the virtual 3D space including the base plane. Initially, the 3D space contains only an empty base plane that is uniformly colored with a neutral color such as white. The software preferably has perspective correction capabilities and preferably lighting simulation capabilities (for example as provided by standard libraries such as DirectX, OpenGL etc.) and optionally, also has dithering and bilinear or trilinear filtering capabilities. The CPU may also be configured to run a software that includes the native parsing and rendering engine of the document to be viewed (such as a web browser that parses and renders HTML documents).

The system preferably includes a computer input device, such as a computer mouse, keyboard, joystick, or remote control, for selecting a view ray. The system may optionally include a display device for displaying the viewing surface such as a computer monitor, television, or set-up box. The CPU may optionally be configured to display the viewing surface on the display device.

The system may respond to the position or direction of movement of the user, his proximity to an element, actual time spent near it, or the number of times an element is approached. For example, a displayed content element that is stationary when viewed from a distance may be animated as the user approaches. The programming does not have to be downloaded from the server at this point, is preferably intrinsic to the character itself. As another example, if the user moves the viewpoint to within a predetermined distance from a content element or the perspective is directed towards an element, the time the user spends in close inspection of the object may be determined and stored in a memory. These actions may be initiated without the user to performing any action such as clicking on the element.

In yet another aspect of the invention, the invention provides a method for repositioning content elements of a page in a virtual 3D space. In accordance with this aspect of the invention, a page's content elements are repositioned while preserving the page's layout. For example, if the layout specifies that a particular content element is positioned at the top of the page, that content element may be moved in the plane of the page into a region of the plane above the page's top so that it remains above the page's other content elements, but separated from them by a greater distance than previously. As another example, if the layout specifies that a first content element is to be positioned to the left of a second content element, the first content element may be moved into a region of the plane to the left of the page's left side so that it remains to the left of the second content element, but separated from them it a greater distance than previously. As yet another example of repositioning a page's content elements while preserving the page's layout, one or more of the content elements may be lifted above the plane in the 3D space. Some of a page's content elements may be rotated from their original orientation in which they lie in the plane so that they project from the plane into the 3D space, at an angle to the plane.

In one embodiment of the invention, the base plane is internally sub-sectioned into areas, each of which is to contain a document page. The software executes the following steps:

1. The document to be viewed is streamed to the native parser along with the document's embedded and URL linked resources. The document script, such as HTML, is read along with all its content resources through a resource locator, such as a URL.
2. The native parser separates in real-time the document's image into its content elements that may be, for example, flat rectangular components or rendering sub-clients (such as frames in an HTML, pictures in a text block, video rectangle, Flash animation rectangle etc. or in win32—device contexts) in internal RAM. Instead of rendering the document's bitmap image it directly to the viewport window, the bitmap image is either rendered onto internal memory, resulting in an internal bitmap surface, (as with current document browsers) or the document is broken up into content elements as defined by the document's layout script instructions and each content element is rendered to a separate bitmap surface in internal memory. In either case, the result of this step is a memory-stored pool of bitmap surfaces. The system also saves the relative locations of the surfaces.
3. The location of each document page in the base plane is determined.
4. The system renders the bitmap surfaces once into memory, but renders the 3D space once for every selection of view ray, after the relative positions of the surfaces have been perspective corrected. For each view ray:
   a. The system calculates the perspective of the 3D space as determined by the view ray, and calculates an updated version of each bitmap surface that is perspective corrected (relative to the perspective of the view ray).
   b. The system renders the bitmap image of each content element in the base plane in the 3-D space in the same order and relative positions as they would be laid out in the original document, as if it were rendered on a native browser (such as a web browser for an HTML document). The surfaces may then be positioned above the base plane either parallel to it or at an angle.
   c. All of the above are rendered (optionally using mipmaping and z-ordering, as required) into a common secondary memory (the original versions of the surfaces are kept in their original memory locations) in the following manner. The bitmap surfaces may be rendered parallel to the base plane. Alternatively, different surfaces may have different elevations above the base plane. Directional lighting is introduced into the 3D space and shadows are cast from the surfaces onto the base plane as determined by the elevation of each surface and the direction of the lighting. Different elevations are evident by different lengths of the shadows. A content element may be rotated out of the base plane to make it appear projecting from the rest of the page. Other 3D objects (3d meshes with or without textures mapped over the mesh) can be rendered on or above the base plane. The 3D objects may be rendered as projecting from the base plane either over a content element, or in the space between elements. This gives the appearance of a real paper page that is combined with 3D terrain or 3D objects on the document or around it.

The client viewer mechanism may also have polygonal mesh 3D model simulation capabilities, in which case the base plane and any surface above that plane is actually a flat mesh in 3D space.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 4A to 4D show views from different perspectives of a portion of the 3D space

FIGS. 17A to 17C show another form of interactivity;

FIGS. 18A and 18B show two views of the same scene of the 3D space after addition of site-wide information;

FIG. 20 shows another accessory 202 that has been positioned in the 3D space that serves as a guide to the site.

DETAILED DESCRIPTION OF THE INVENTION

FIG. 1 shows a method for arranging pages and content elements in a virtual 3D space and projecting a portion of the 3D space onto a viewing surface in accordance with one embodiment of the invention. A 3D coordinate system is created in the 3D space having an x-axis, a y-axis and a z-axis. The three axes are preferably mutually perpendicular. A base plane 60 is designated in the 3D space that is parallel to the x and z-axes. The base plane 60 preferably has a neutral color such as white, and may contain a grid pattern.

Figure 1A:
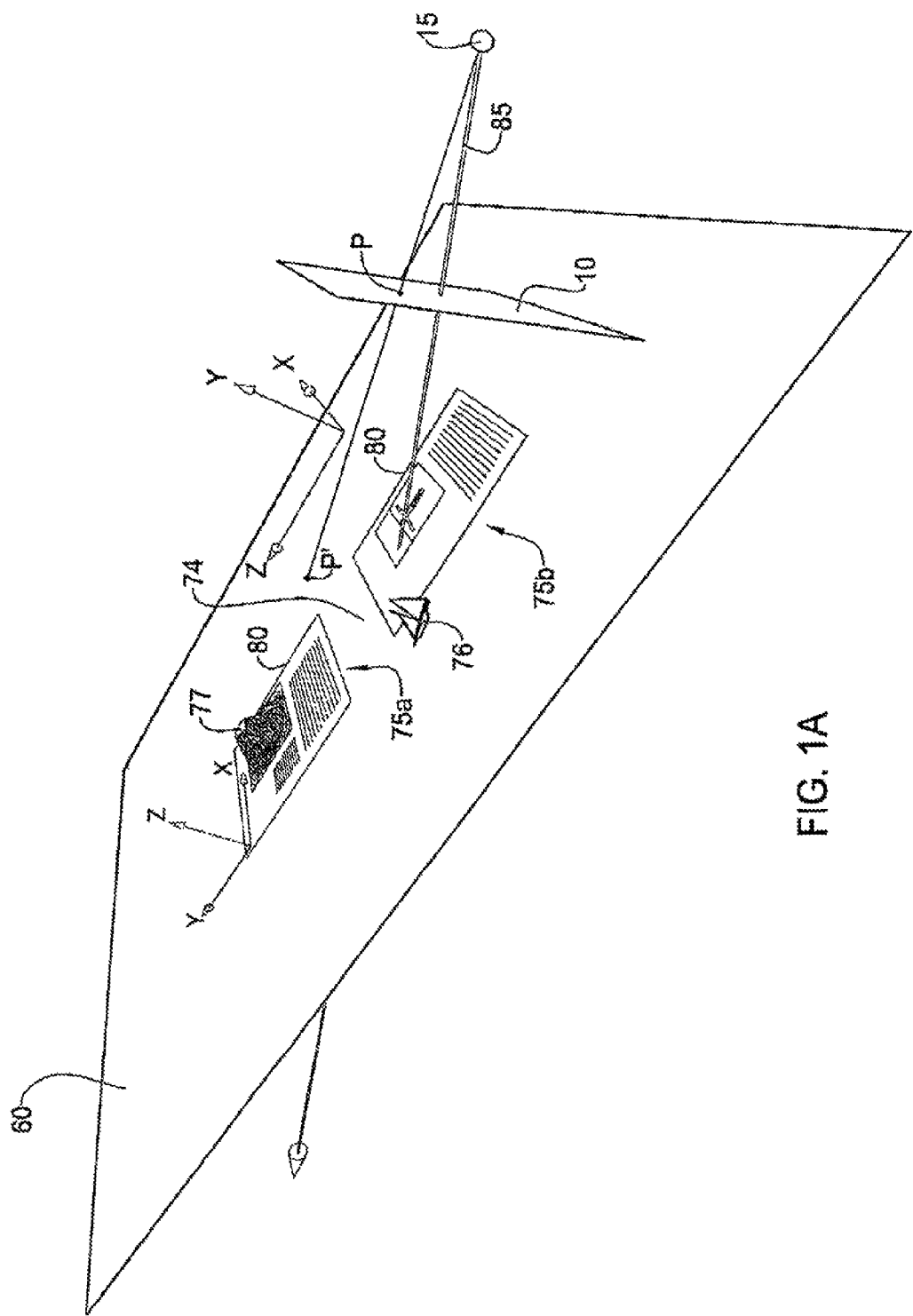
FIGS. 1A and 1B show arrangement of visual content in a virtual 3D space.

As shown in FIG. 1a, two pages 75a and 75b have been positioned in the base plane 60. The pages 75a and 75b are preferably positioned in the base plane with their sides 80 parallel to the z-axis and with their tops oriented in the same direction. A content element 76 that is not part of the layout of either of the pages 75a and 75b has been placed on the base plane so as to be associated with the nearby page 75b. The page 75a contains a content element 77 that is a 3D volumetric content element. The pages are preferably positioned on the base plane so as to be separated from one another. A portion 74 of the base plane 60 (referred to as "white space") is thus visible between adjacent pages in the space.

Once the pages and content elements have been positioned in the 3D space, a virtual viewpoint 15 and a viewing ray 85 extending from the viewpoint are selected in the 3D space. The view ray 85 determines the perspective from which the 3D space is to be viewed. The view ray 85 is parallel to the 3D space z-y plane and is preferably selected so that the tops of the pages 75 are located further away from the viewpoint 15 than the bottoms. Pages oriented in the base plane in this way are said to be "aligned to z".

Figure 1B:
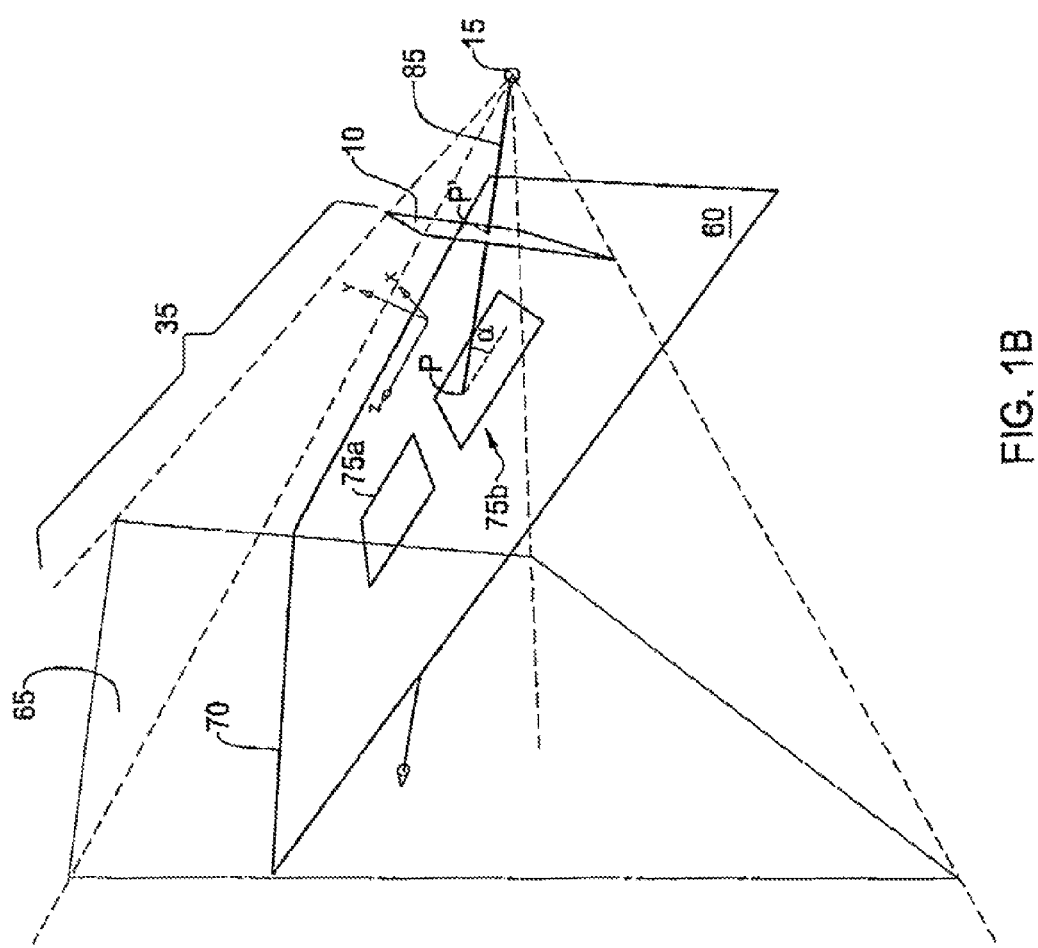

A viewing surface 10 is then positioned in the 3D space perpendicular to the viewing ray 85 and at a predetermined distance from the viewpoint 15 surface. As shown in FIG. 1b, the viewpoint 15 and the viewing surface 10 define an infinite pyramid indicated by broken lines. The viewing space 35 is the region of the 3D space enclosed in the frustum of the pyramid determined by the viewing surface 10 and represents the portion of the 3D space that is to be projected onto the viewing surface 10. The viewing space 35 may optionally be cropped by a cropping plane 65 that is parallel to the viewing surface 10. In this case the line of intersection 70 between the cropping plane 65 and the base plane is referred to as the "horizon".

In accordance with this aspect of the invention, the view ray 85 and the base plane 60 are neither parallel nor perpendicular to each other. The view ray thus intersects the base plane 60 at an angle $0°<\alpha<90°$.

The view ray 85 and the viewing surface 10 define a projection of the viewing space onto the viewing surface, referred to as "the perspective projection determined by the viewing ray and the viewing surface". Under this perspective projection, a point P in the viewing space is projected onto a point P' on the viewing surface 10 so that the points P, P' and the viewpoint 15 are collinear. Since the view angle $0°<\alpha<90°$, a rectangular page aligned to z will have a trapezoidal projection on the viewing surface 10 with a top and a bottom parallel to the x-axis of the 2D surface. The projection of the viewing space 35 on the viewing surface 15 may be displayed on a display device such as a computer monitor, television, or set-up box. Changing the view ray 85 changes the viewing space 35. The view ray may be made to change continuously so as to give the user a feeling of gliding in the 3D space.

Figure 2A:
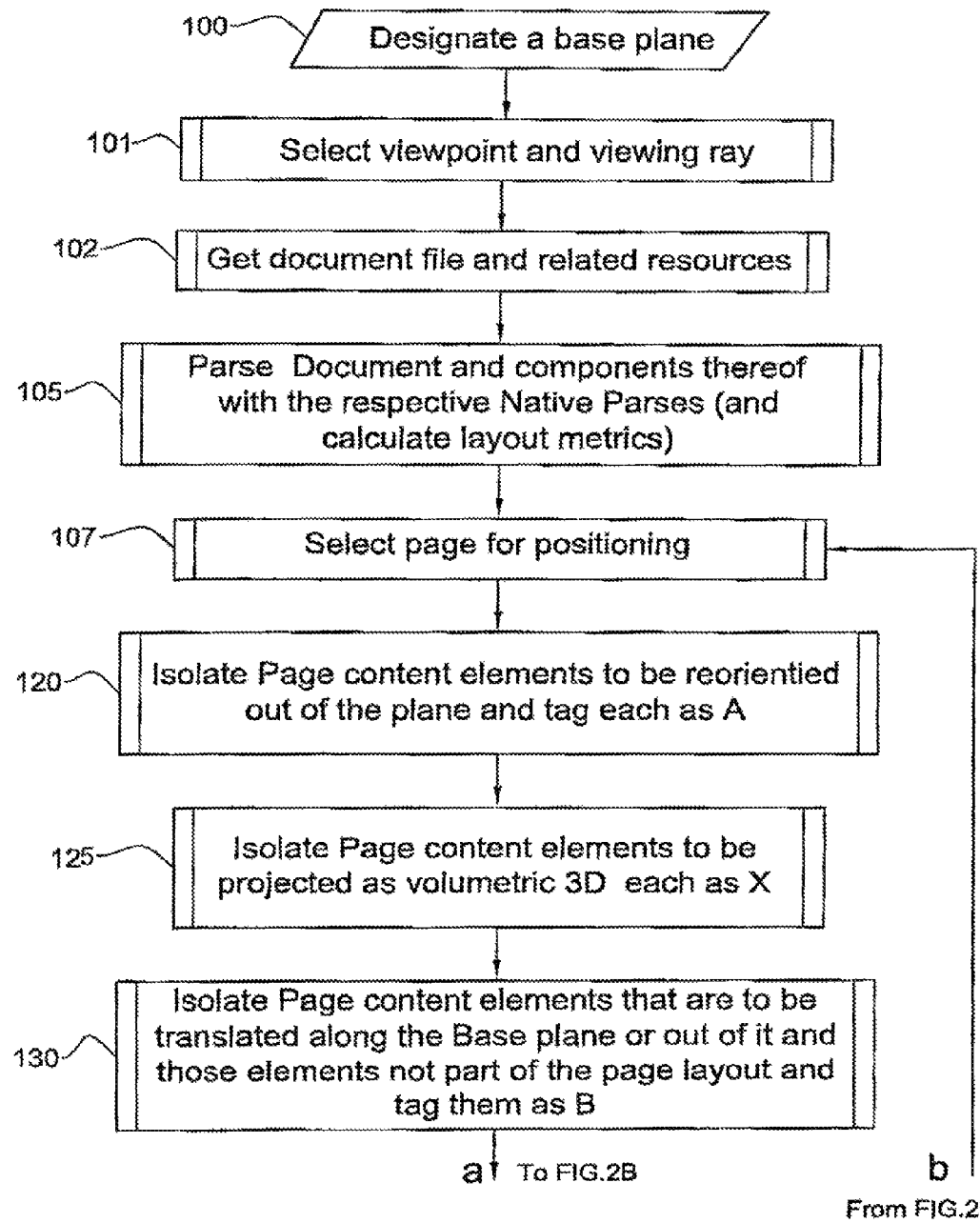
FIGS. 2A and 2B show a flow chart diagram for viewing a 3D space on a viewing surface.
Figure 2B:
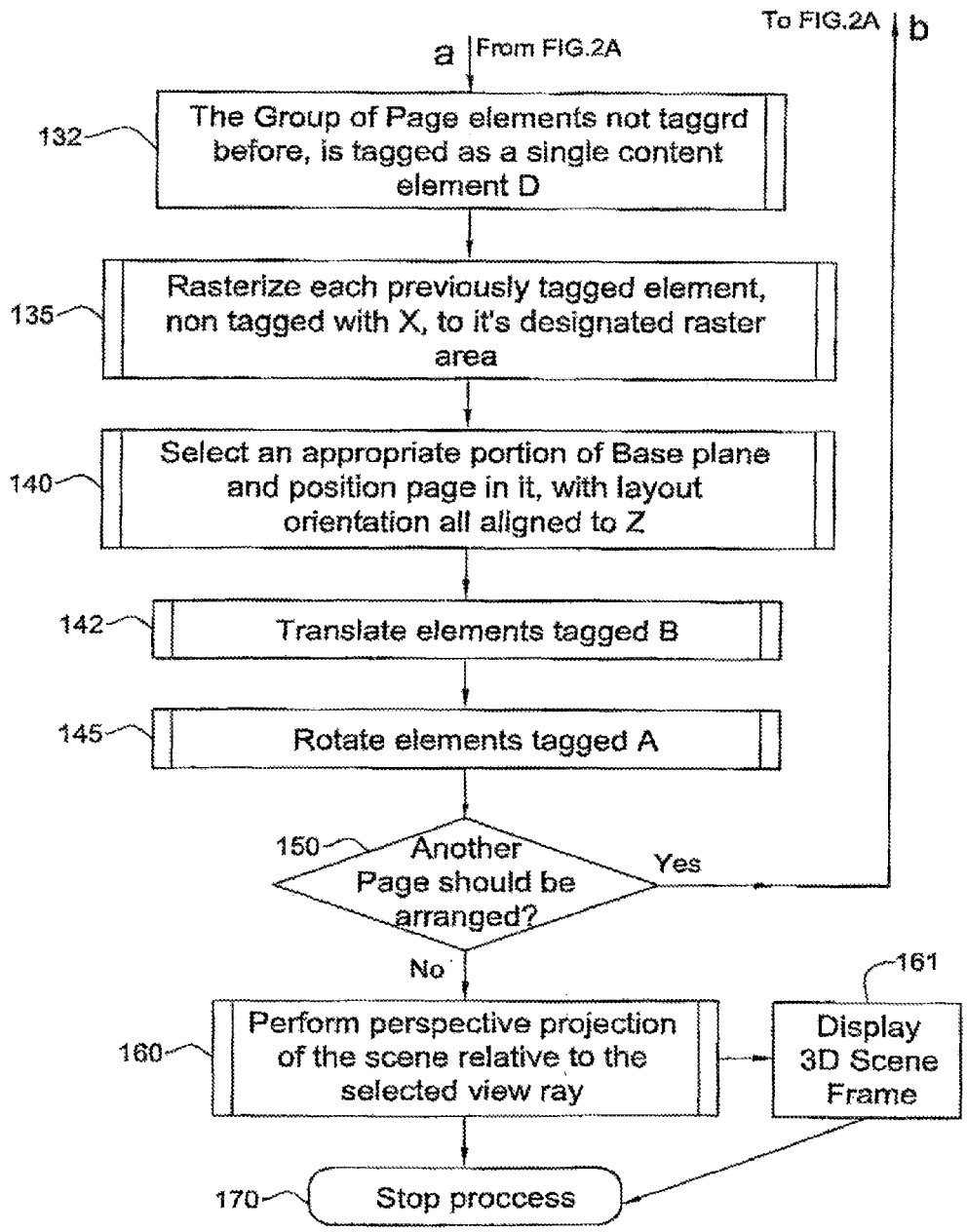

FIG. 2 shows a flow chart diagram for a process of arranging one or more document pages and possibly content elements that are not parts of a page layout, in a virtual 3D space, such as the 3D space depicted in FIG. 1, projecting the 3D space onto a viewing surface, and displaying the viewing surface in accordance with one embodiment of the invention. In step 100, a base plane is selected. In step 102 the document file is loaded or downloaded along with some or all of the available resources linked to it or embedded. In step 105, the document is parsed by its native parser or parsers, and the layout metrics are calculated for each page and content elements. In step 107 a page to be positioned is selected. In step 120, content elements in the selected page, as well as content elements associated with the page but not part of the page's layout, that are to project out of the base plane are tagged accordingly with a first tag referred to as "A". In step 125, the page's content elements that are volumetric are tagged with a second tag "X". In step 130, the page's content elements, as well as content elements associated with the page but not part of the page's layout, that are to be translated in the base plane or out of the base plane are tagged with a third tag "B". In step 132, the page's content elements, as well as content elements associated with the page but not part of the page's layout, not previously tagged are now tagged as a single aggregate with a fourth tag "D". In the tagging steps 120, 125, 130 and 132, a content element may be assigned more than one tag. In step 135, all of the page's 2D content elements (i.e. all of the page's content elements except those tagged X) are rasterized, each one to its designated raster surface. These content elements will be positioned in the 3D space as 2D content elements. In step 140, the page is positioned in an appropriate portion of the base plane. By "appropriate portion" is meant that the portion of the base plane is dimensioned to receive the page with possibly some white space around it. In step 142, the content elements tagged B are translocated as required, either parallel to the base plane, or out of the base plane. In step 145, content elements tagged A are rotated. In step 150, it is determined whether another page is to be positioned in the base plane. If yes, the process returns to step 107. If no, then in step 155 a viewpoint and a viewing ray are selected, and a viewing surface is positioned in the 3D space so that it intersects the viewing ray. Then, in step 160, the perspective projection determined by the selected viewpoint, viewing ray, and viewing surface, is calculated, including 2D and volumetric 3D elements, as described above in reference to FIG. 1. In step 161, the projection on the viewing surface is displayed on a display device, and the process terminates.

Figure 3:
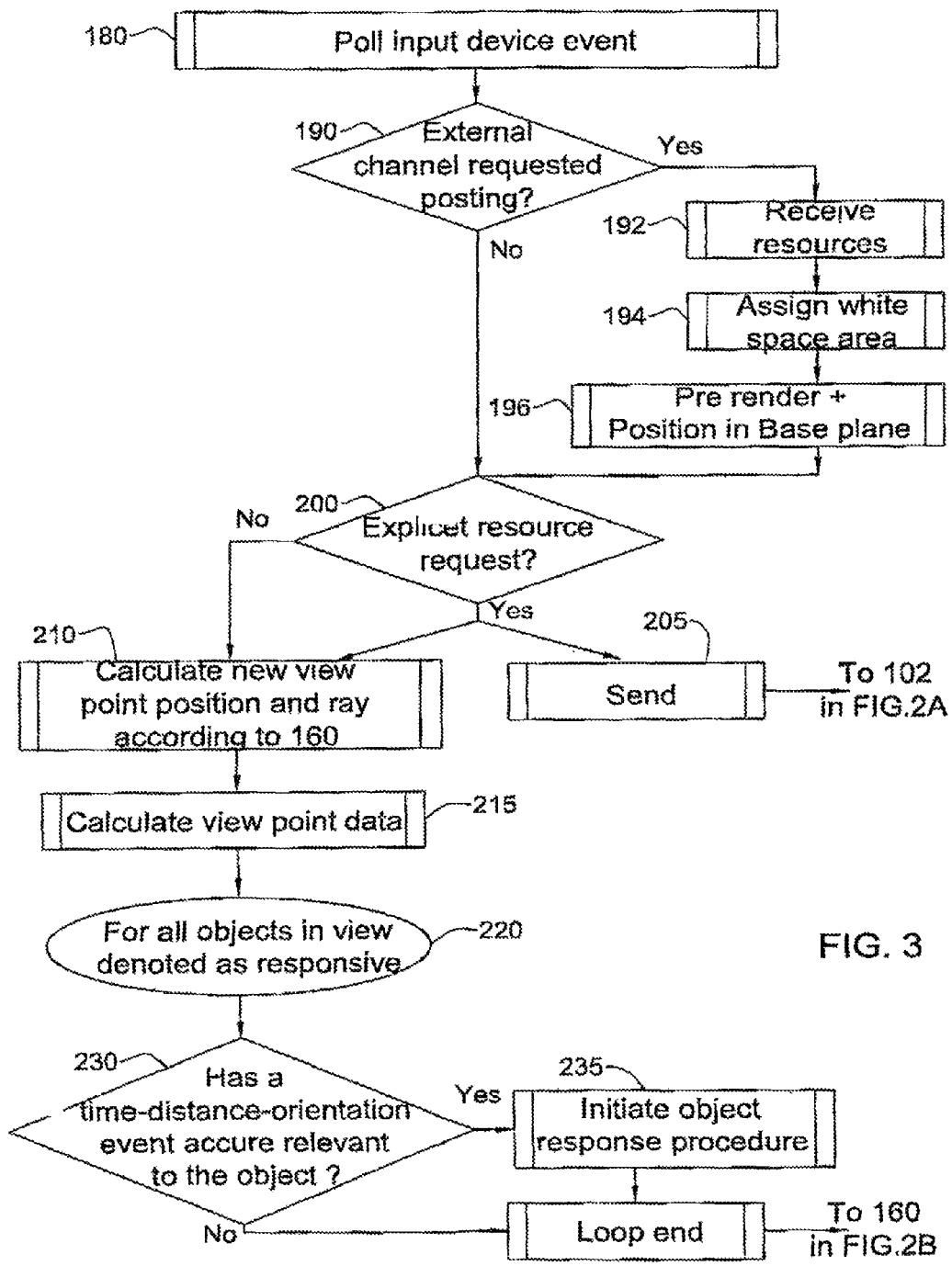
FIG. 3 shows a flow chart for an extended process that begins with the process shown in FIG. 2.

FIG. 3 shows a flow chart for an extended process that begins with the process shown in FIG. 2. The process includes a frame-by-frame updating and response mechanism that is integrated into the rendering system of the positioning perspective projection. The extended process is identical to the process shown in FIG. 2 until step 161. The extended process continues from step 161 with step 180 instead of step 170. In step 180, one or more input devices such as a computer mouse or a computer keyboard are polled. In step 190, it is determined whether an external channel has posted a resource to be displayed. If yes, then in step 192 the new script and resources are received from the external channel and parsed. The process then proceeds with step 194 with a white space area previously allocated or currently free being assigned to the resource. Then in step 196, any preliminary operations that may be necessary, such as rasterizing to surfaces, are performed, and the external resource is positioned in the assigned white space area. If at step 190 it is determined that an external channel has not posted a resource to be displayed, then in step 200 it is determined whether an explicit resource, such as a new page, has been requested by the user. If yes, then in step 205 a process is initiated consisting of steps 102 to 150 of FIG. 2.

Figure 4A:
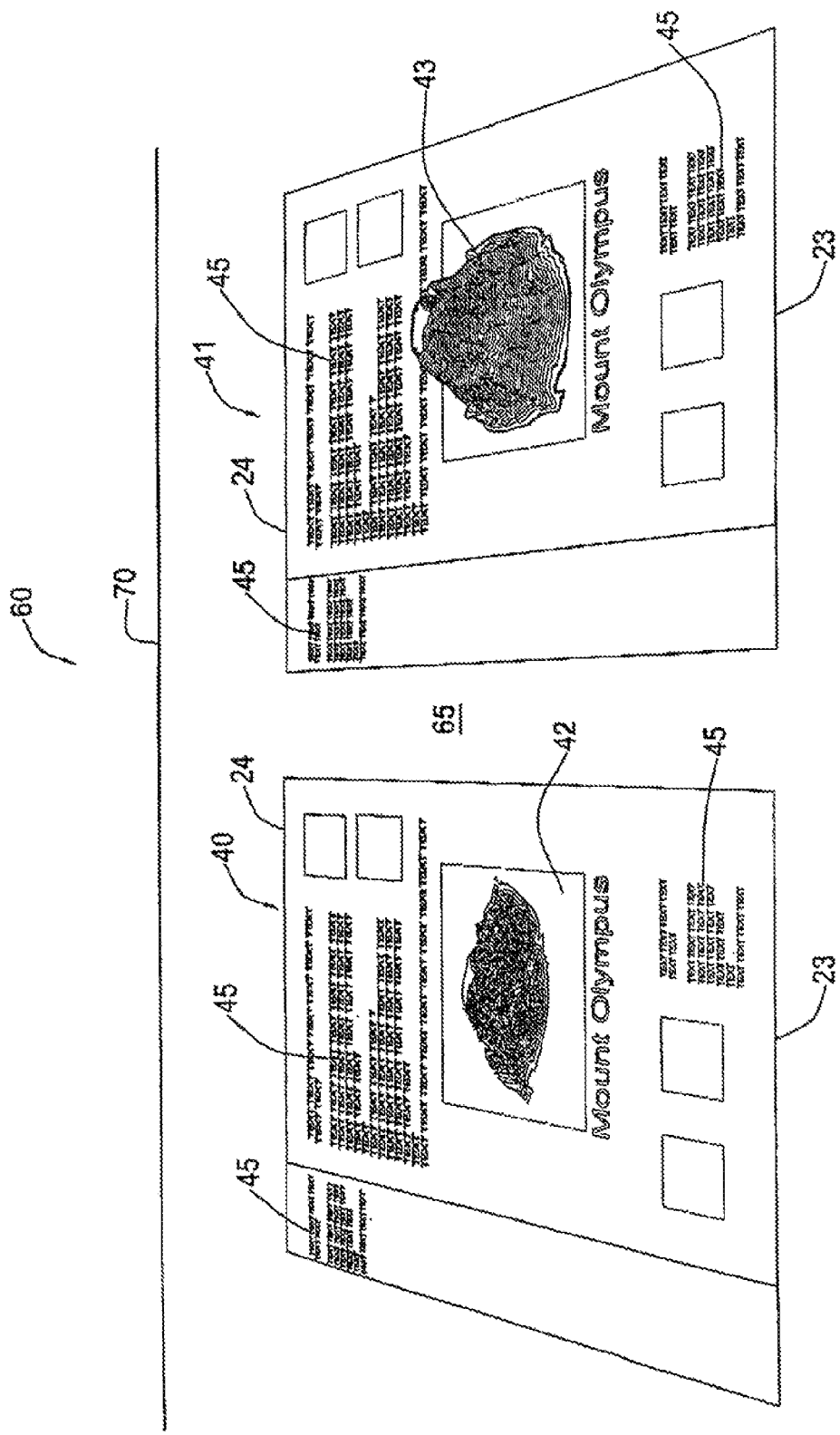
Figure 4D:
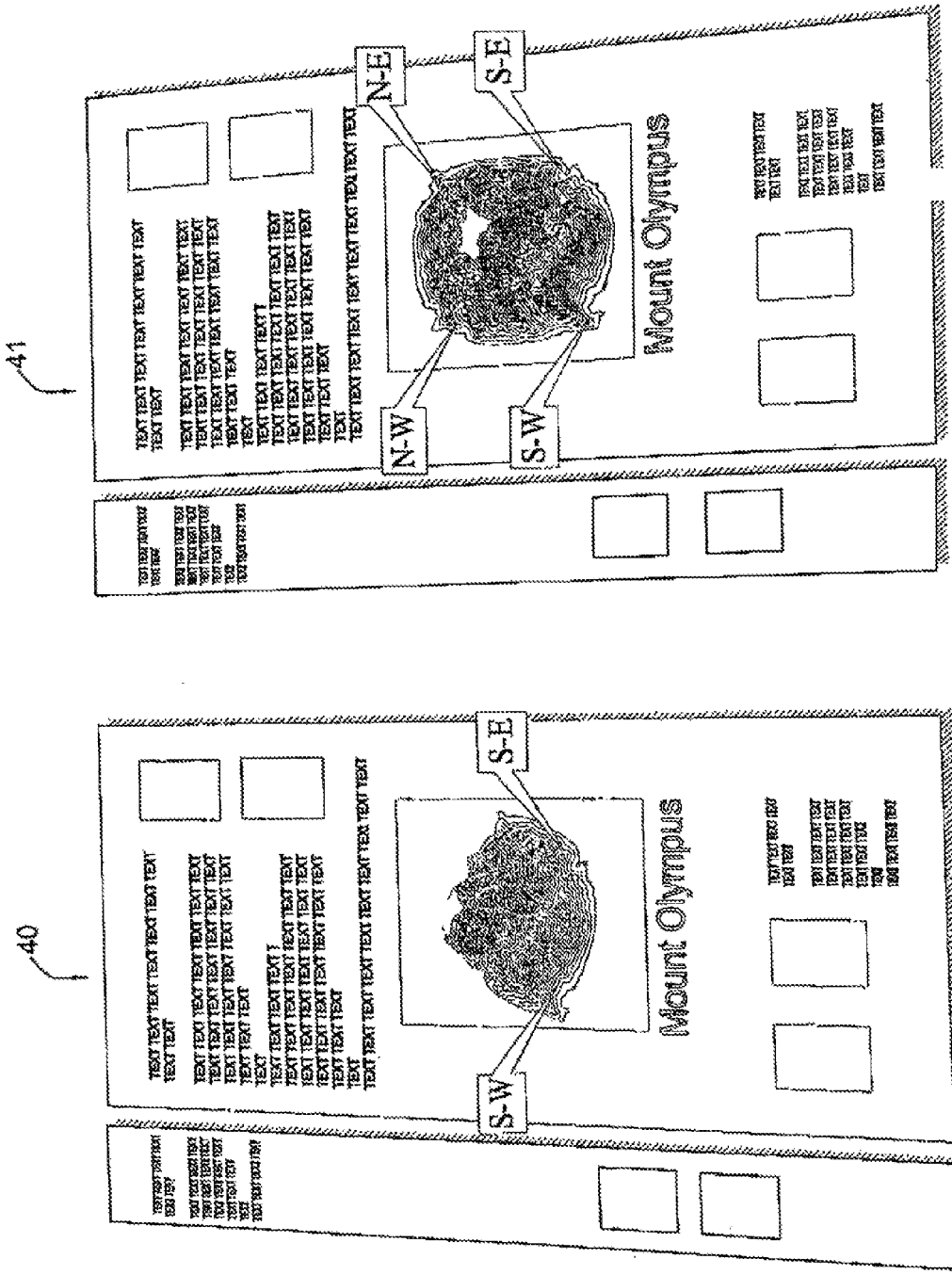

Simultaneously or sequentially, in step 210, a new viewpoint and new viewing ray are calculated based upon input event or events polled in step 180. Then in step 215, parameters of the history of the viewpoint or the viewing ray are then calculated such as the recent velocity or acceleration of the viewpoint. In step 220, it is determined, for each content element in the view space or in a predetermined view range known to be responsive, whether the information calculated in step 215 implies that an event has occurred between the viewpoint and the content element. If yes, the content element initiates in step 235 a response behavior. The process then continues with step 160 of FIG. 2. The extended process shown in FIG. 3 is repeated until interrupted by a special command FIGS. 4a to 4d show views from different perspectives of a portion of the 3D space in which a page 40 and a page 41 have been positioned in the base plane 60. The two pages 40 and 41 are separated from one another so that white space 65 is visible between and around the two pages. The pages 40 and 41 contain identical content element data, including data indicative of a 3D mountain. However, for page 40, the data indicative of the mountain have been tagged as "D" in the algorithm described above in reference to step 132 of FIG. 2a, while the same data has been tagged as "X" for page 41. Thus, in page 40, the mountain is rendered as a 2D object (a picture) 42, while in page 41, the mountain is rendered as volumetric 3D object 43. FIGS. 4a to 4d show the view space from different perspectives. The two pages 40 and 41 will appear identical only when the mountain 43 is viewed from the same perspective from which the picture 42 was made. FIG. 4d emphasizes that while only the "southeast" and "southwest" corners of the mountain will be visible in all perspectives of the page 40, different combinations of the northeast, northwest, southeast and southwest corners will be visible in different perspectives of the page 41. Due to the oblique angle at which the base plane 60 is viewed, the pages 40 and 41 have a trapezoidal shape with a wide edge 23 proximal to the user and a narrow edge 24 close to the virtual horizon 70. The pages 40 and 41 are thus seen to be in 3D perspective. This creates a sense of realness as it shows the pages 40 and 41 as the user would see it if he were holding them in his own hands.

Figure 5:
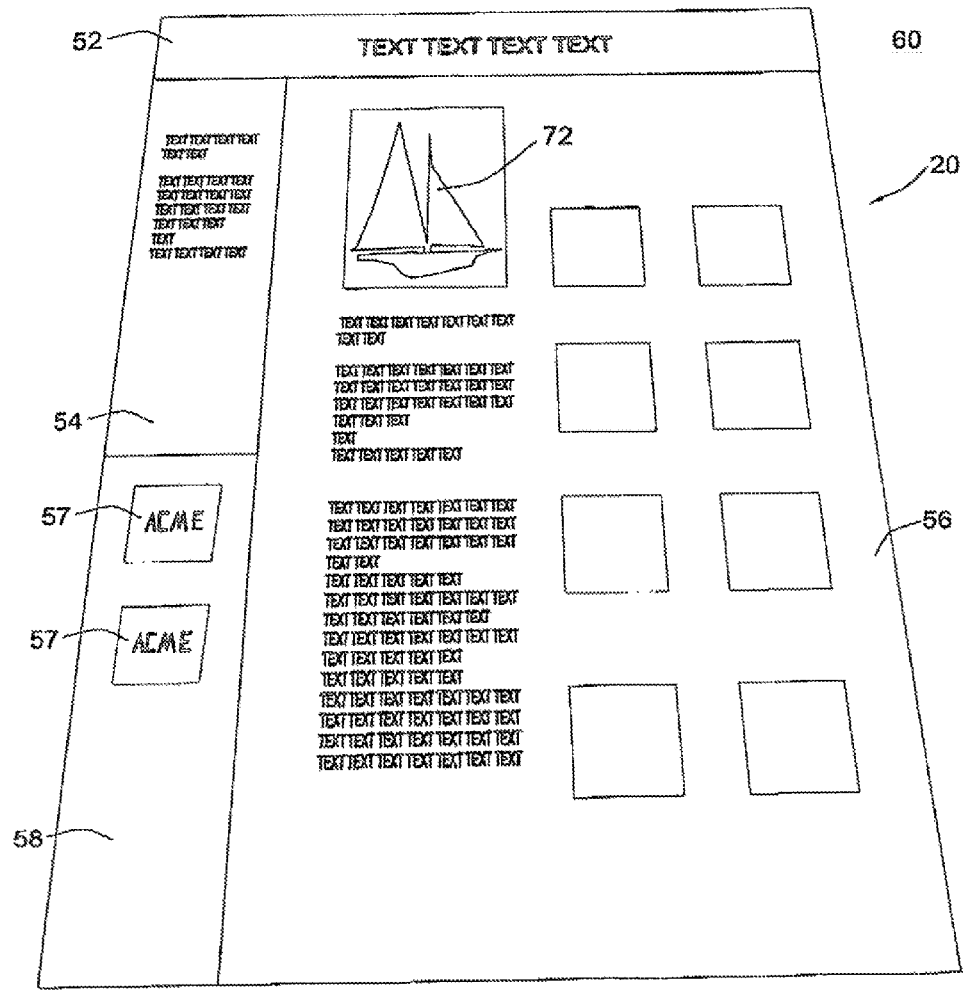
FIG. 5 shows a portion of a 3D space in which a page 20 has been positioned in a base plane 60 in accordance with the invention.
Figure 6:
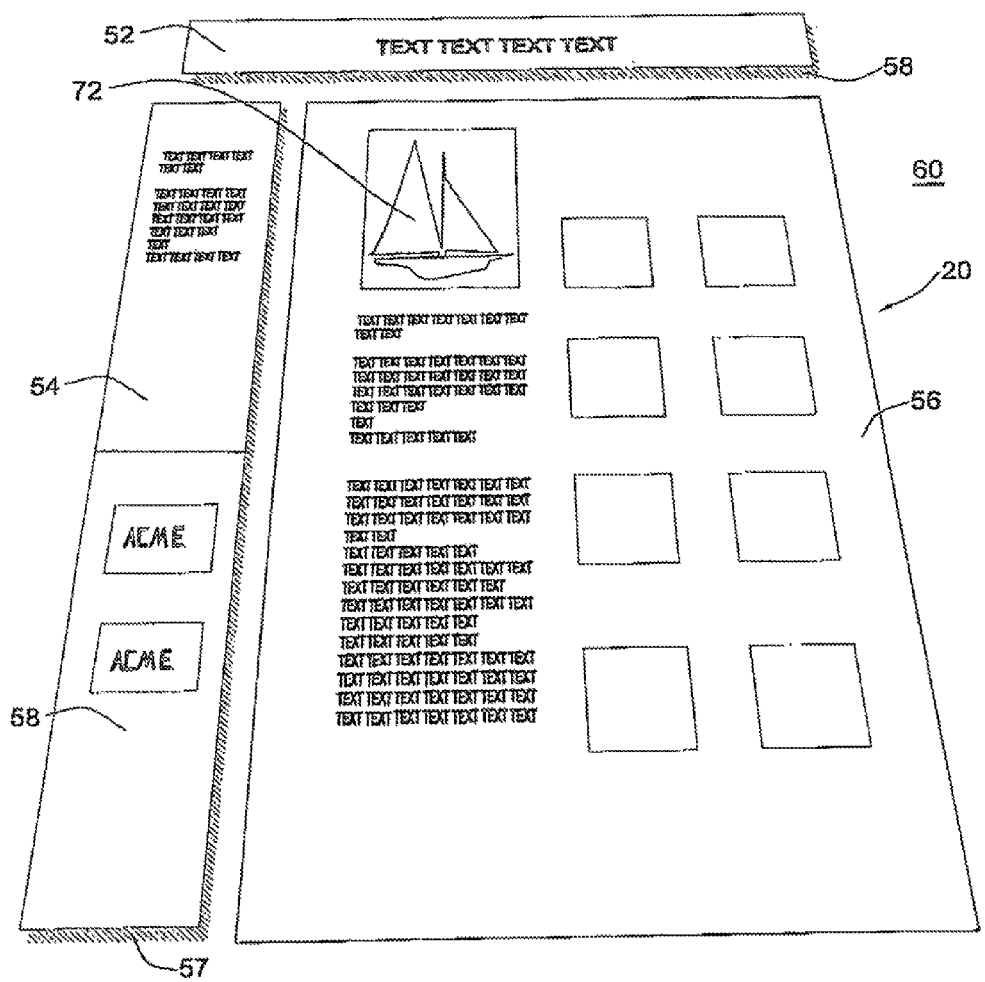
FIG. 6 shows the page 20 after repositioning a header block 52 and a menu block 54.

FIG. 5 shows a portion of the 3D space in which a page 20 has been positioned in the base plane 60. The page 20 contains as content elements a header block 52, a menu block 54, and an advertising block 58 containing two advertisements 57. A text block 56 consists of several content elements such as a sailboat element 72. The content elements of the page 20 have been rasterized and parsed as separate objects, which allows their separation and possible projection into the 3D space. FIG. 6 shows the page 20 after repositioning the header block 52 and the menu block 54 in the white space adjacent to the page 20. This creates a clear separation of the functional parts of the document from its main content area. The header block 52, the menu block 54, and the advertising block 58 have been lifted above the base plane as suggested by the shadows 57 and 58. The text block 56 has not been repositioned. The repositioning of the header block 52 has and the menu block 54 shown in FIG. 6 has preserved the layout of the page 20.

Document layout instructions and formatting tags are rasterized with the document and elements. There is no need to return to the script form of the document for re-interpretation. The system re-rasterizes automatically tens of times per second from a single interpretation of the document. For example, on zoom and tilt, which are continuous, there is no need to return to the document.

For scripting languages, tags may correspond to null transformations, e.g. comments, which do not affect the appearance or arrangement of the document information, and which have no effect on the final result, and are not manipulated by the compiler. Tags are generally meta-information interpreted by the document's native software. The fact that script languages can contain null transformations enables interpretation by secondary languages, such as the present invention. This feature is not needed for the complete pages involved with prior art, but once a page has been broken up in accordance with the present invention, tagging may be used for the repositioning of layout elements, by using the parsing of the layout instructions in the original document. For example, tags may be used to specify that a particular layout element should be rotated, and thereby projected up out of the plane of the page. Thus a tag may be a null transformation for a native renderer, but may be an actual transformation for a secondary renderer. Software tags themselves are well known in the art for use with 2D documents. Tags, however, have not been used for information relative to the inventive cluster of layout elements for use in 3D documents, such as the inventive dimensional breakup, and behavioral scripts. Tags may be used to incorporate additional resources that are invisible to the 2D page.

Figure 7:
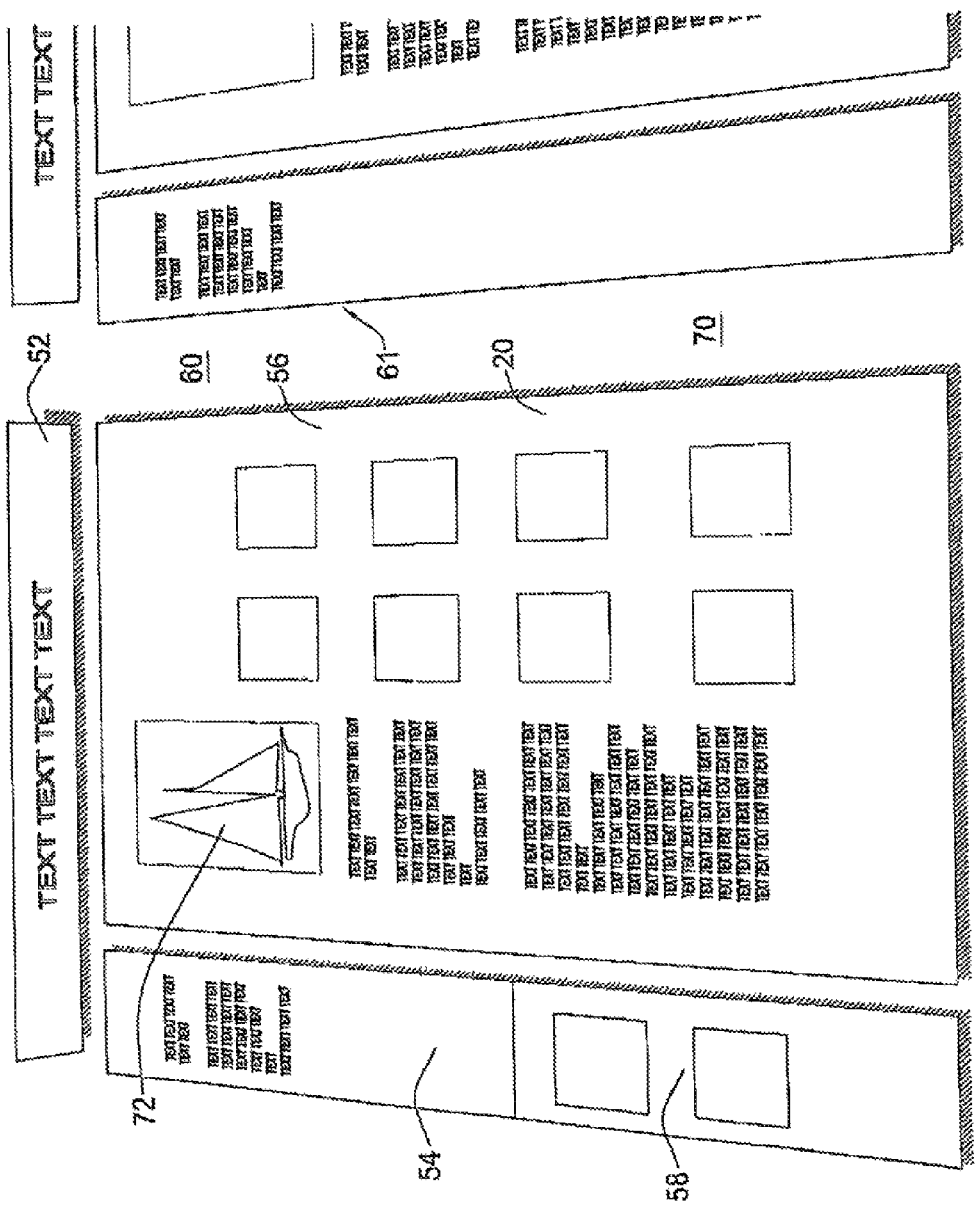
FIG. 7 shows the page 20 after rotation of header block 52.
Figure 8:
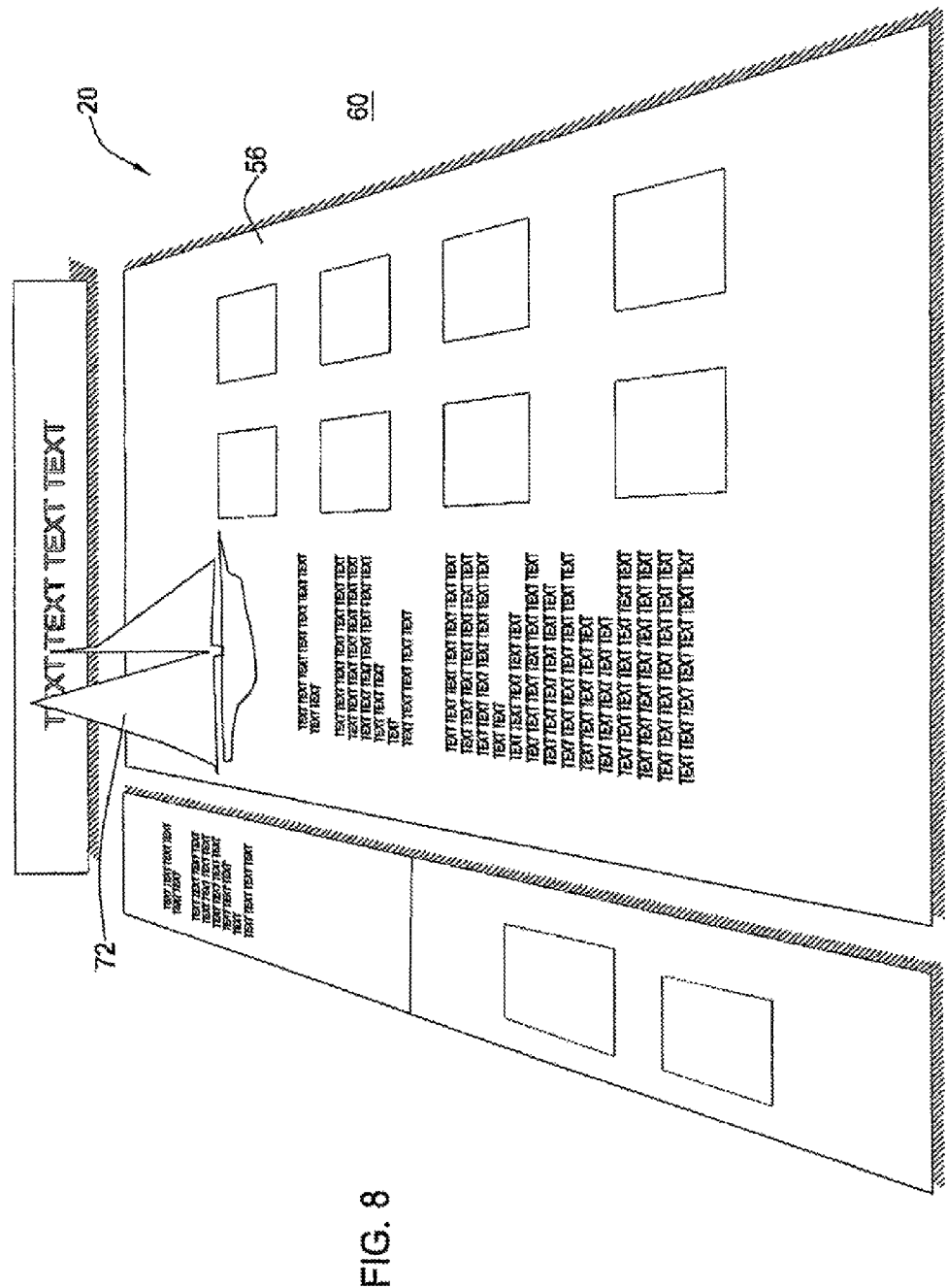
FIG. 8 shows the page 20 after a content element has been rotated to project out of plane 60.

FIG. 7 shows the page 20 after rotation of the header block 52 so that it projects out of the base plane 60 while the menu block 54, the advertising block 58, and the text block 56 remain parallel to the base plane 60. This repositioning of the header block 52 in the 3D space also preserves the layout of the page 20. Another page 61 has been positioned adjacent to the page 20 but separated from it so as to create white space 70 between the two pages 20 and 61. The content elements of the page 61 have also been repositioned while preserving the layout of the page 60. In FIG. 8, the sailboat element 72 of text block 56 has been rotated out of the text block 56 so that it projects out of the base plane 60. This also preserves the layout of the page 20. Content elements that have been rotated so that they are at an angle to the base plane are visible from a great distance, especially when the 3D space is viewed at a small angle α.

Figure 9:
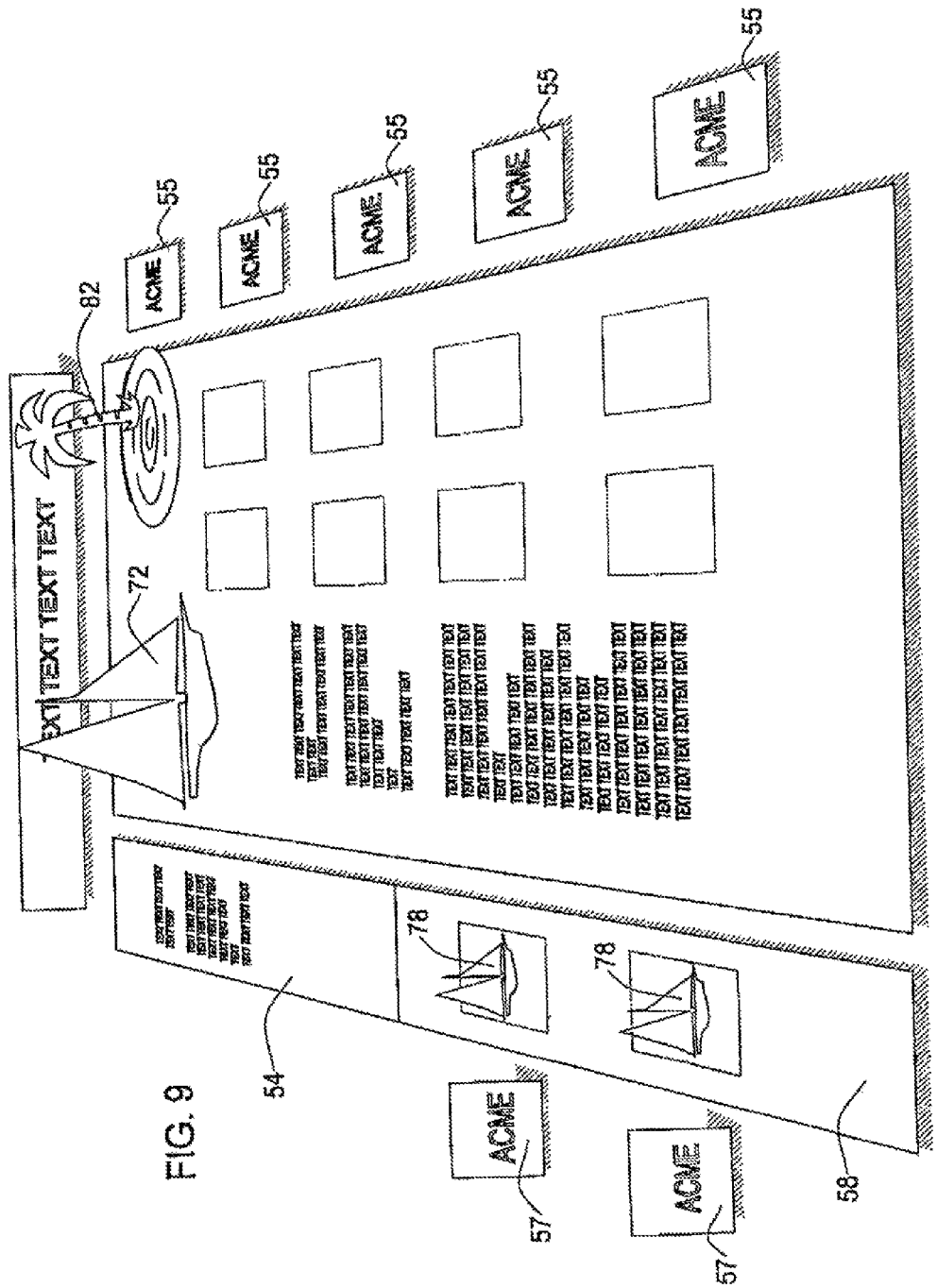
FIG. 9 shows the addition of content elements in the 3D space in the vicinity of a page.

FIG. 9 shows the addition of visual content elements in the 3D space in the vicinity of the page 20. Textual elements 55, that may be for example, advertising, have been placed in the white space. The advertisements 57 that were previously located in the advertising block 58 have been moved to the white space and rotated so as to project from the base plane 60. A volumetric model 82 has been placed in the 3D space projecting from the base plane 60. Sailboat models 78 have also been added that are 2D "sprites", which have no depth, and disappear when viewed directly from above. The textual elements 55 and the models 72 and 82 are not visibly derived from original page 20, but they may be embedded in the document script, which provides for additional information that is not displayed.

Figure 10:
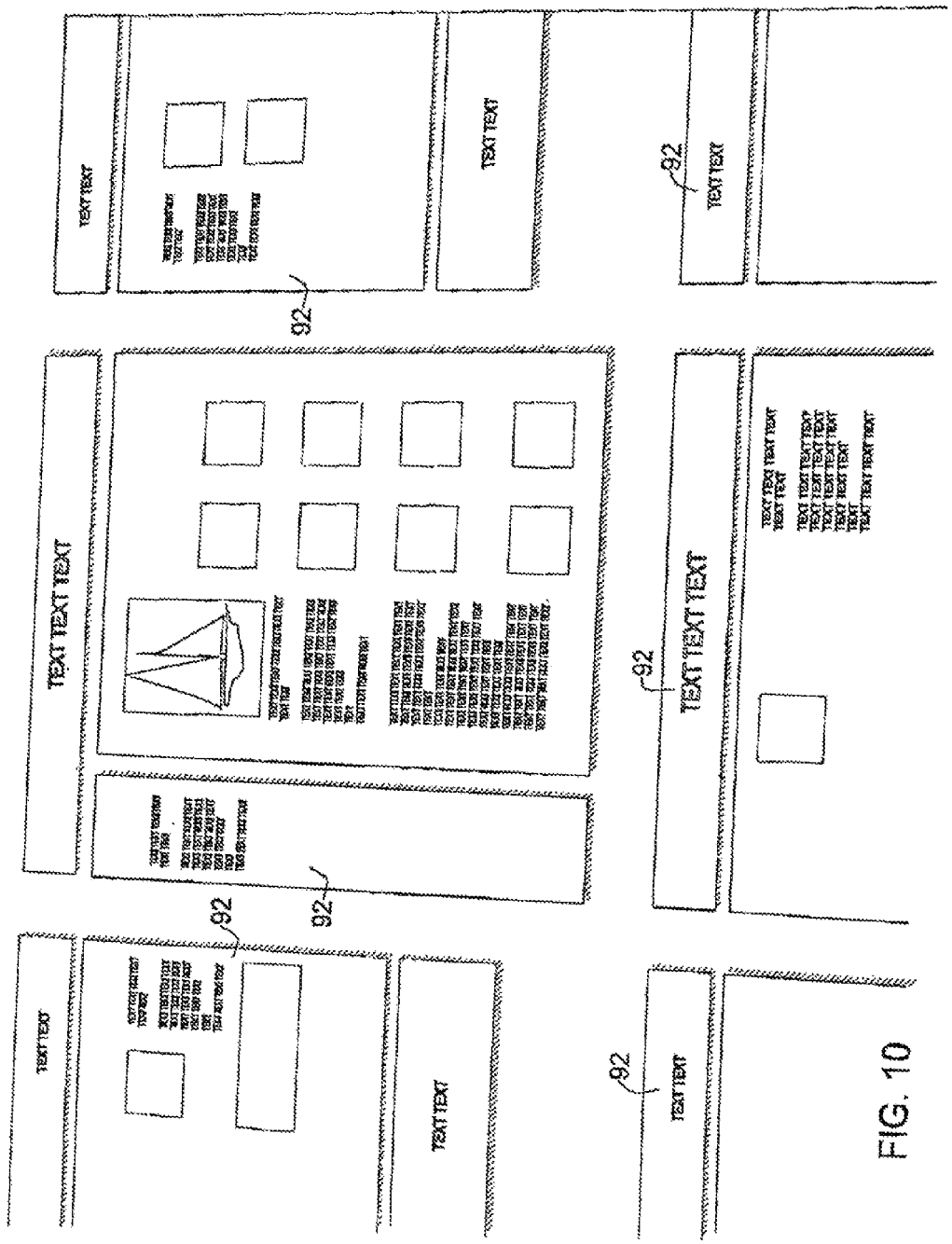
FIG. 10 shows the placement of additional pages in the base plane.

FIG. 10 shows placing several pages 92 in the base plane 60. The pages 92 may be pages from a single document such as a web site or a textual document. In this case the pages are arranged to reflect their order in the document or the order in which they were downloaded.

Figure 11A:
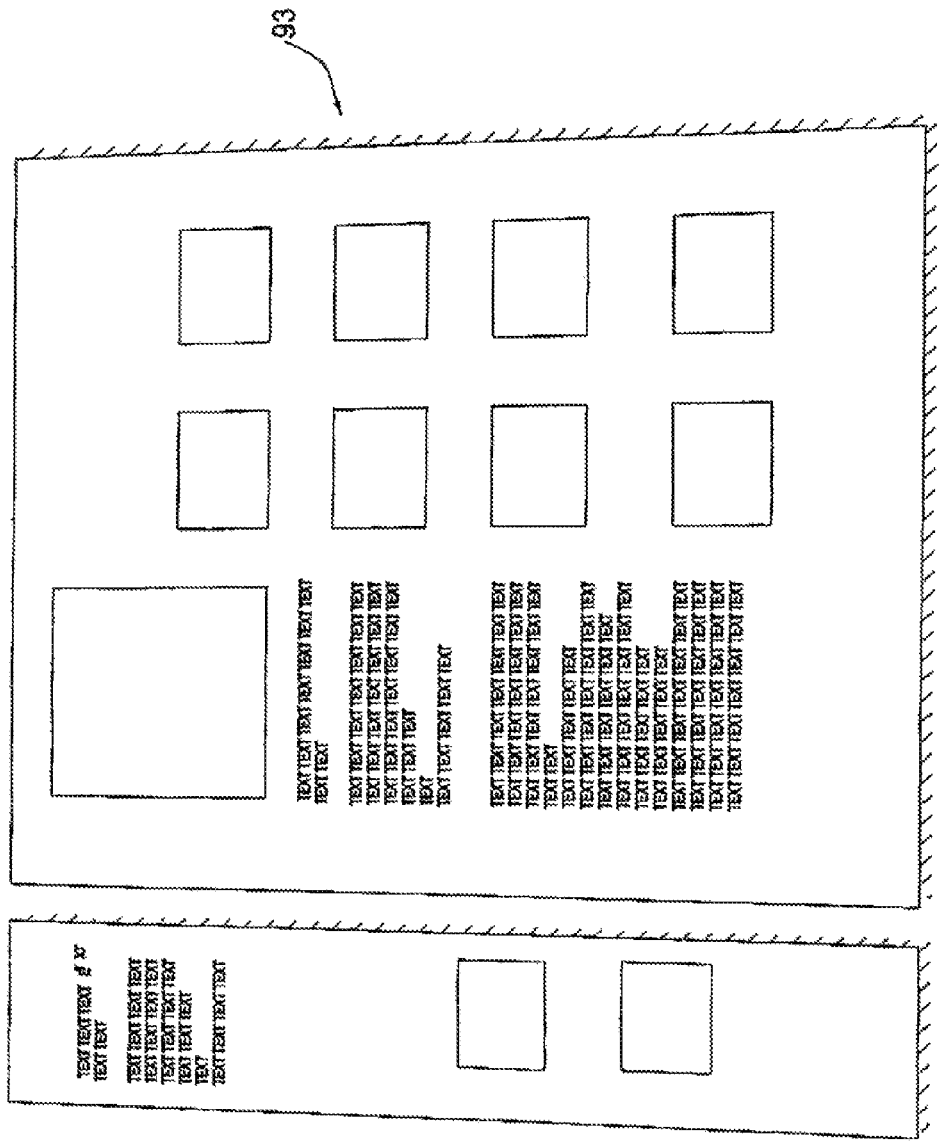
FIG. 11A shows a web site page that has been positioned in the base plane.
Figure 11B:
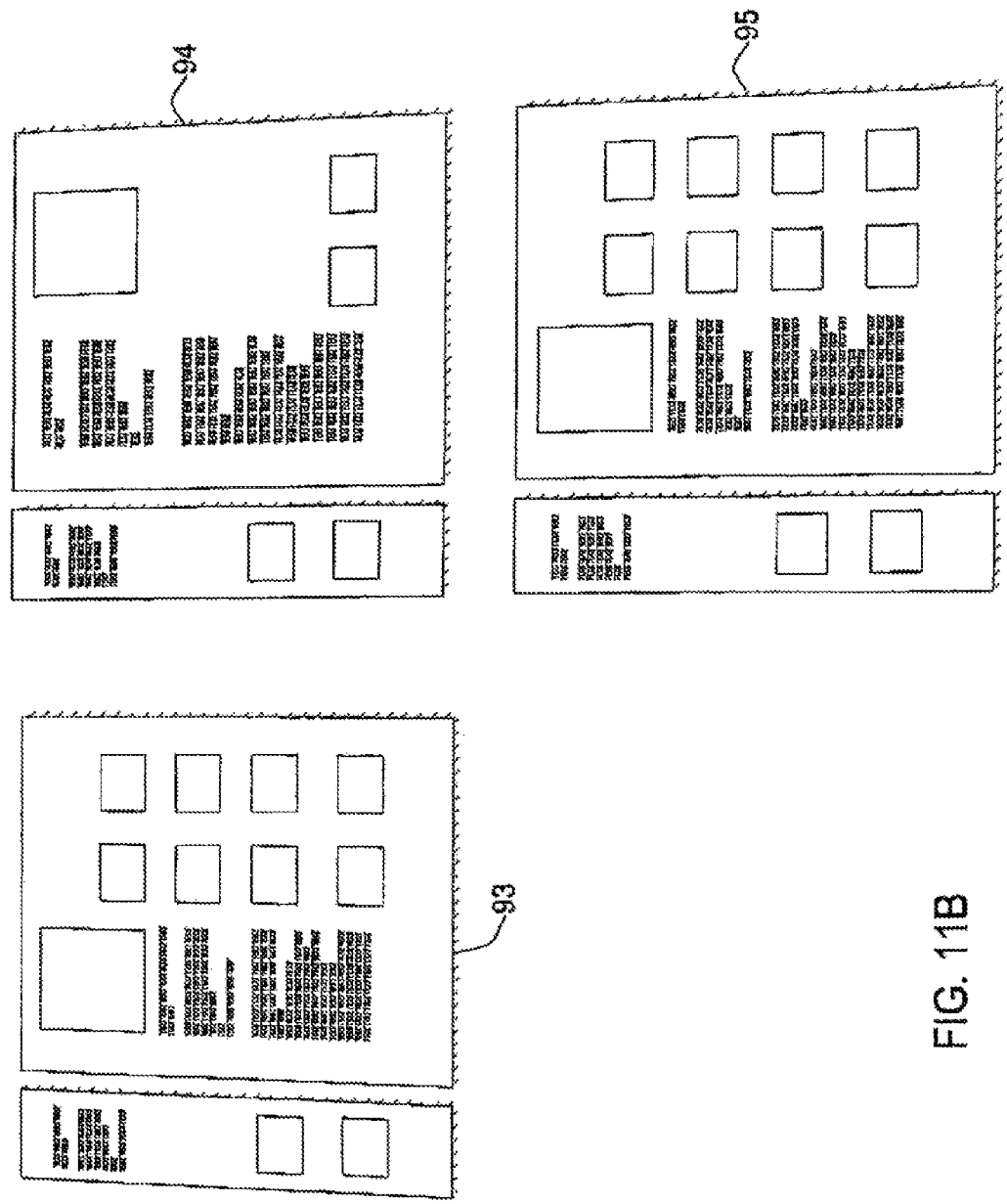
FIGS. 11B and 11C show proliferation of the web site in the 3D space as additional pages are sequentially downloaded.
Figure 11C:
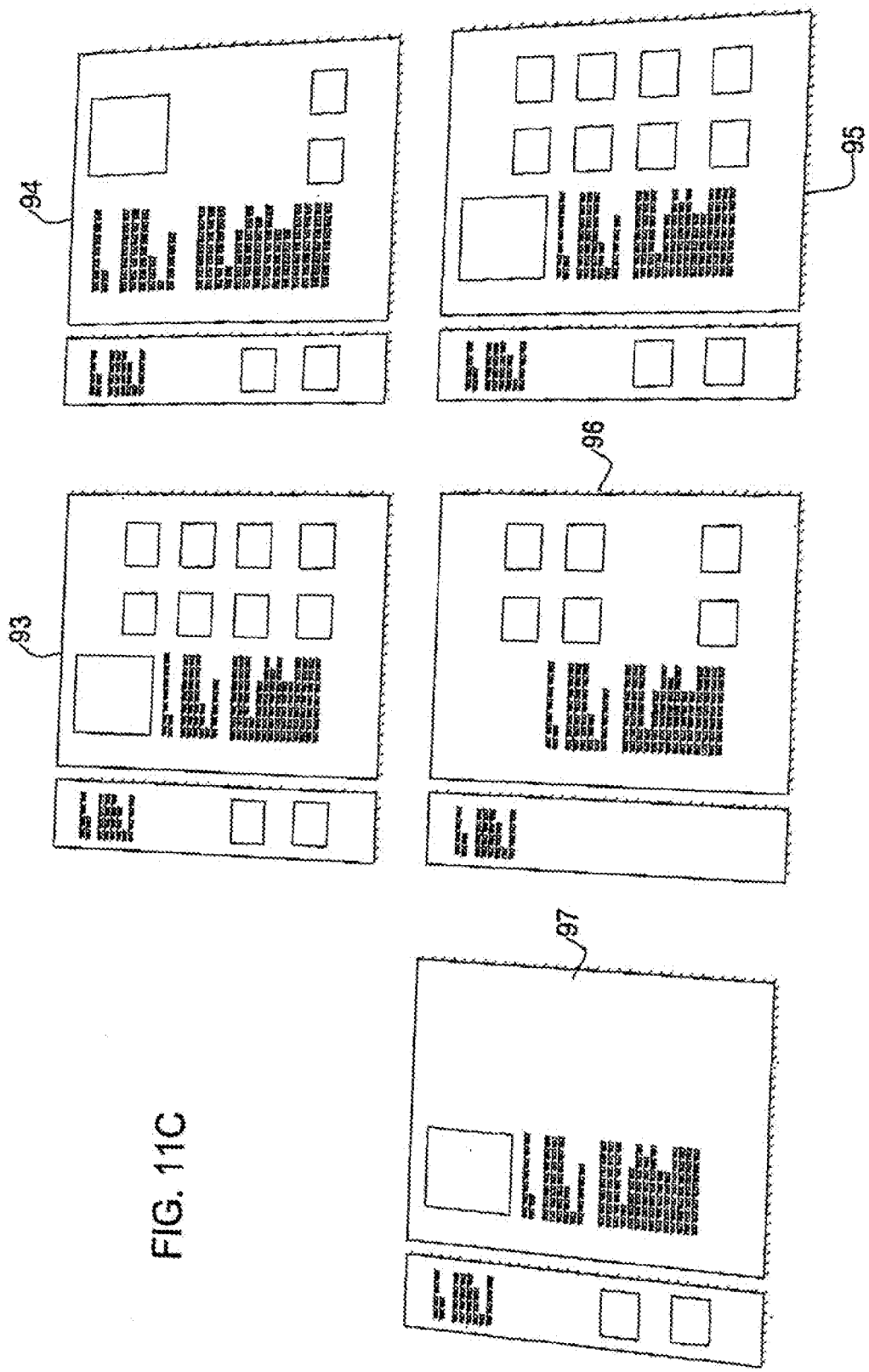

FIG. 11a shows a web site page 93 that has been positioned in the base plane 60. While the user is viewing the page 93, a universal resource locator (URL) is invoked for the Web site. The Web site may be accumulated, for example, in cache memory and downloaded and arranged around the page 93. The position where each page is to be positioned is computed, and the appearance of the Web site in the 3D space is computed. FIGS. 11a to 11c show proliferation of the web site in the 3D space as additional pages 93 to 97 are sequentially downloaded.

Figure 12A:
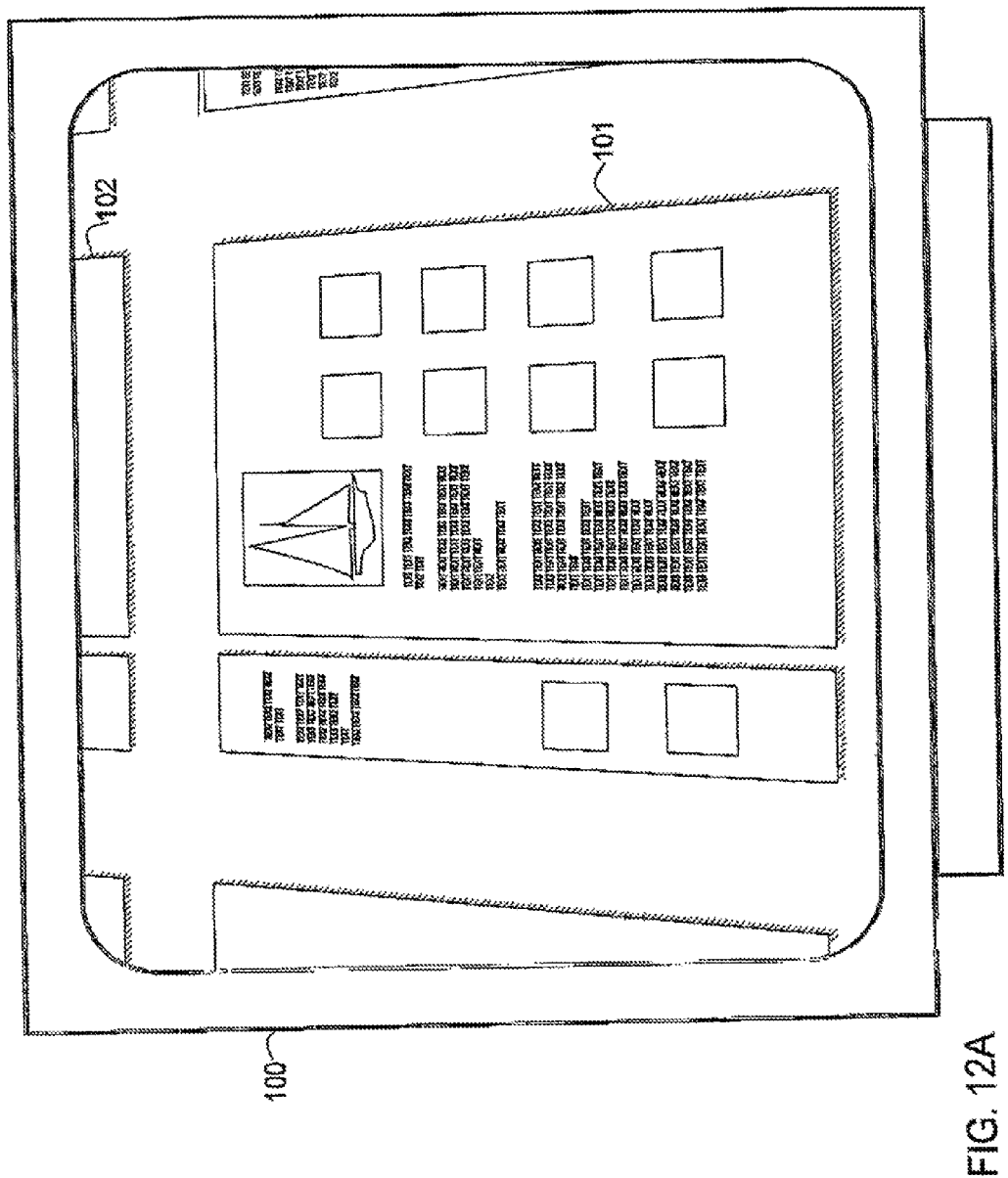
FIGS. 12A to 12F show pages arranged in the 3D space and displayed on a display device 100.
Figure 12B:
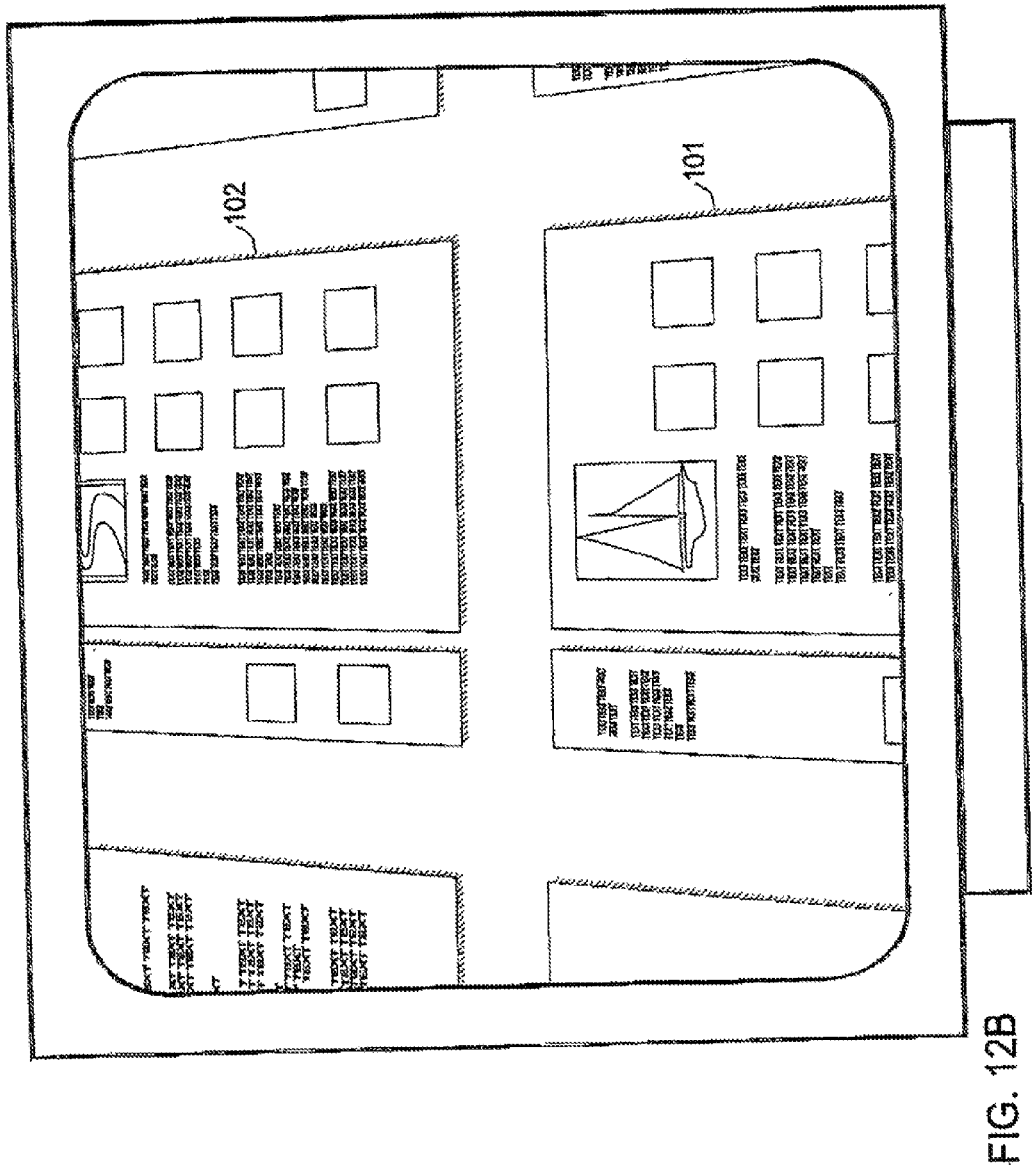
Figure 12C:
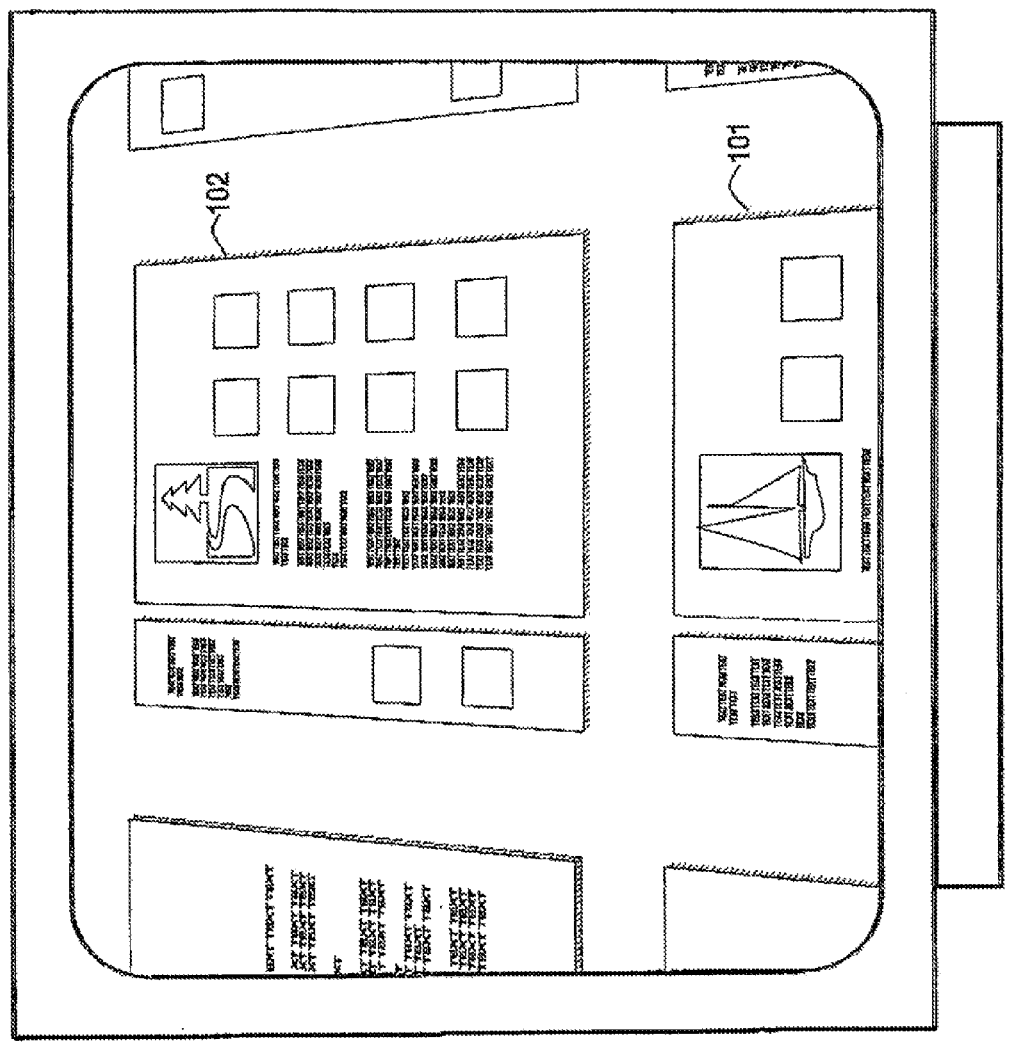
Figure 12D:
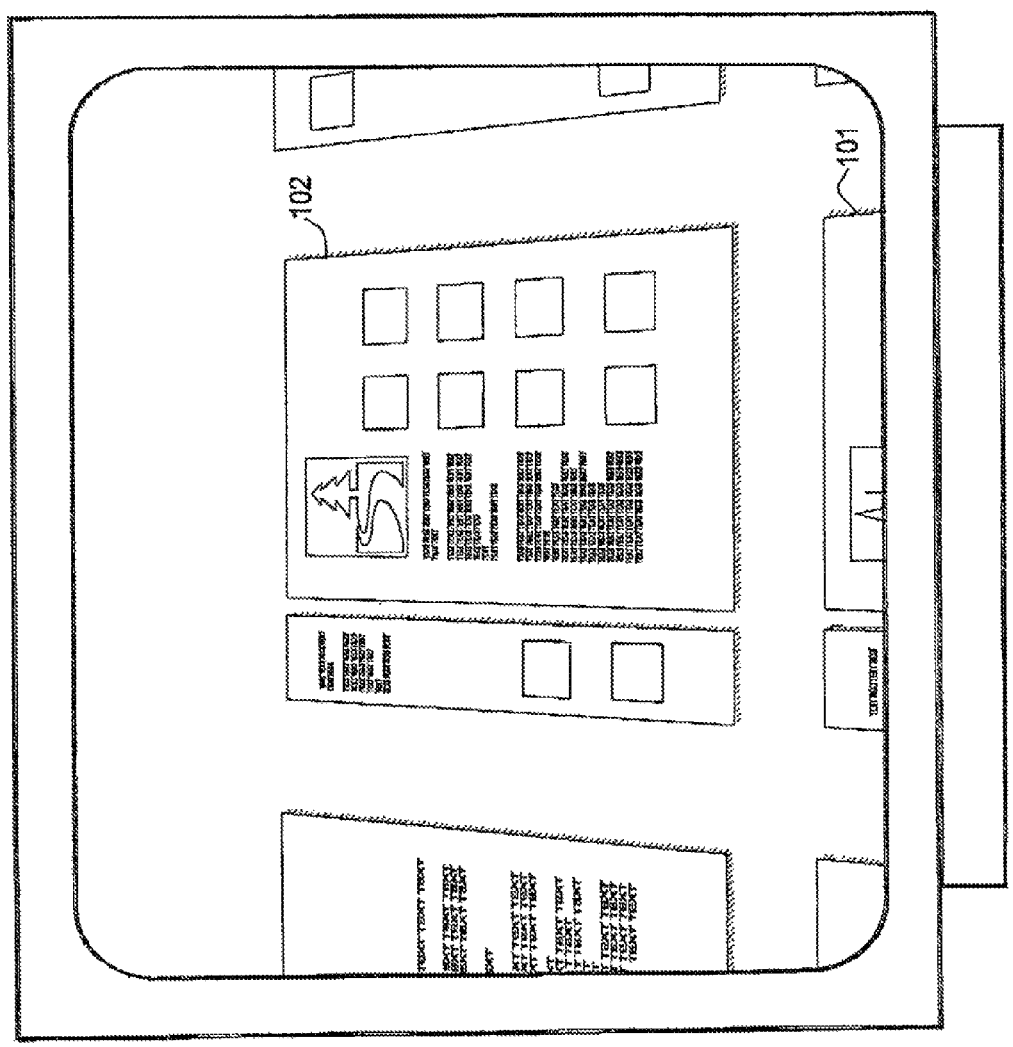
Figure 12E:
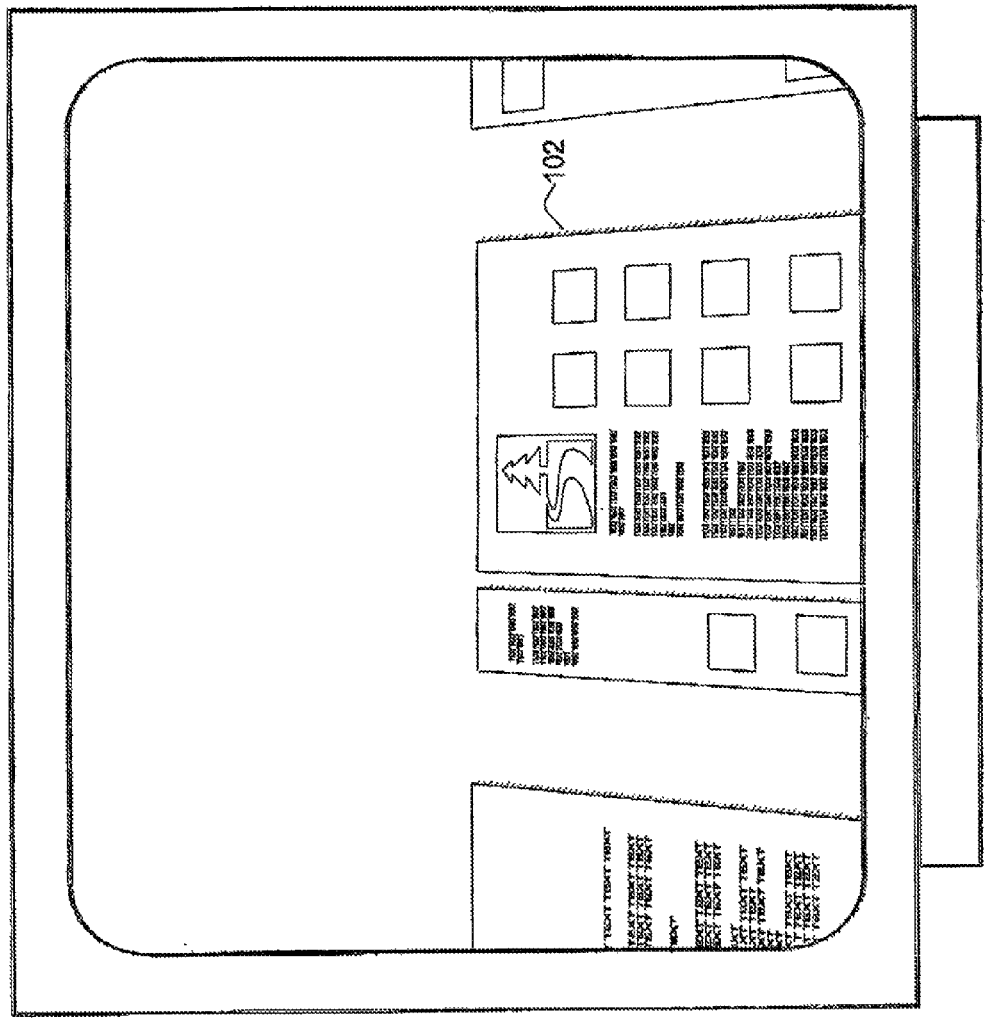
Figure 12F:
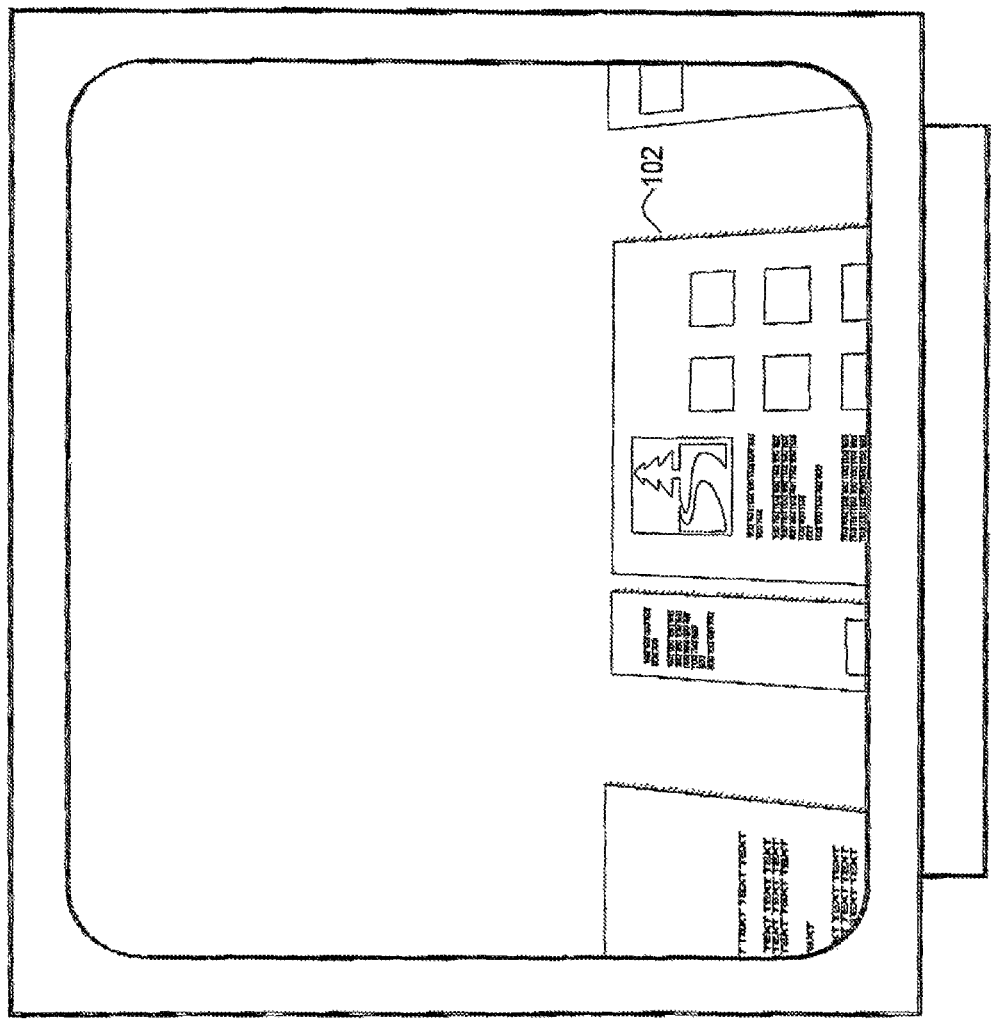

FIGS. 12a to 12f show pages arranged in the 3D space and displayed on a display device 100. FIGS. 12a to 12d show forward moving. In FIG. 12a page 101 is seen together with the bottom of page 102. As the forward moving progresses, the pages 101 and 102 progressively appear lower on the display device 100. In FIGS. 12d and e page 101 is no longer visible on the display device 100. During this forward movement, the viewpoint is moved in a straight line parallel to the base plane and the viewing ray remains parallel to its initial position. Thus, the direction of movement is different from the direction of the view ray.

Figure 13A:
FIGS. 13A to 13C show changes in the view with different perspectives of the 3D space caused by changing the direction of viewing from a fixed viewpoint.
Figure 13B:
Figure 13C:
Figure 14A:
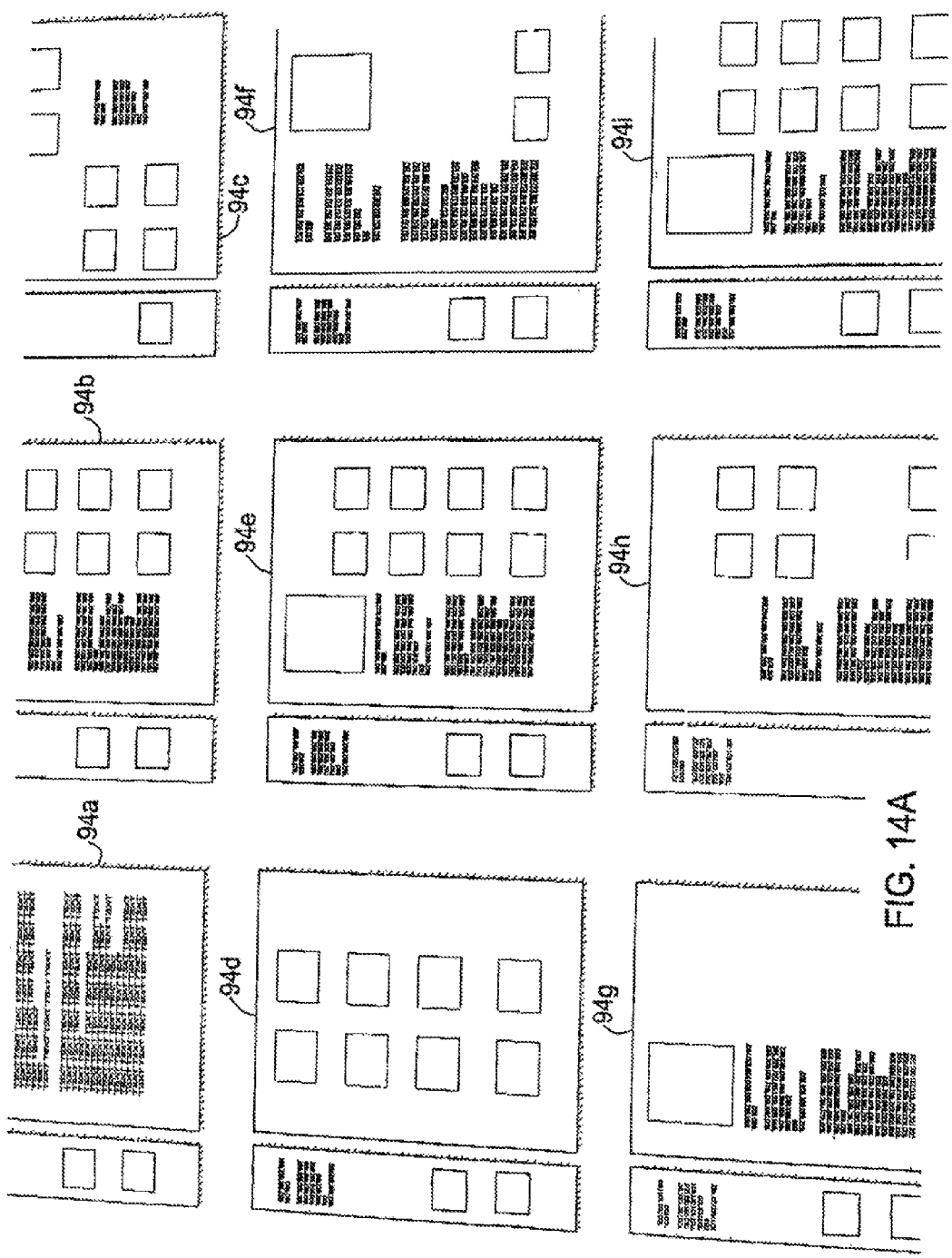
FIGS. 14A to 14D show a sequence of views zooming in on a page screen shots illustrating guiding the user through a prerecorded tour.
Figure 14B:
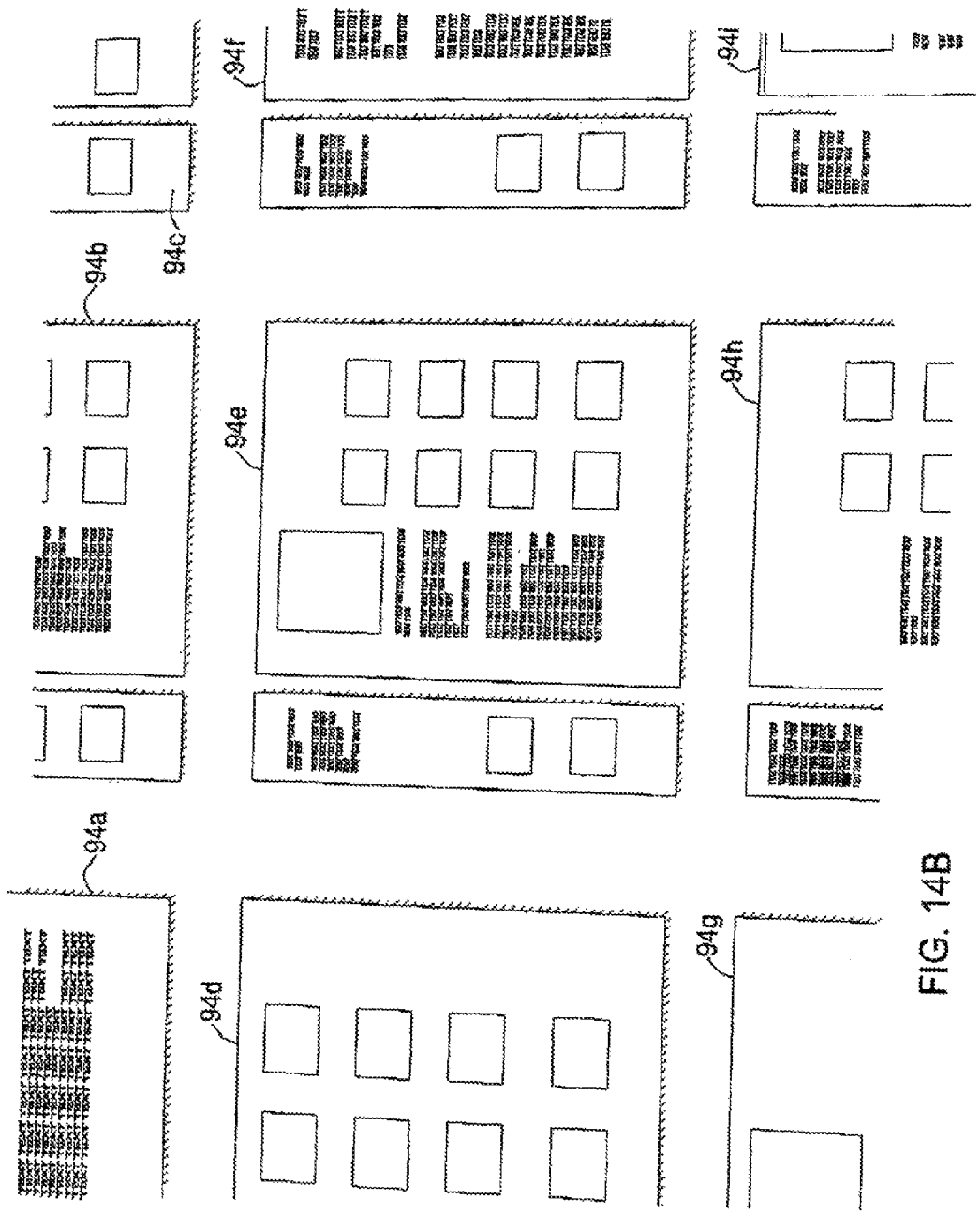
Figure 14C:
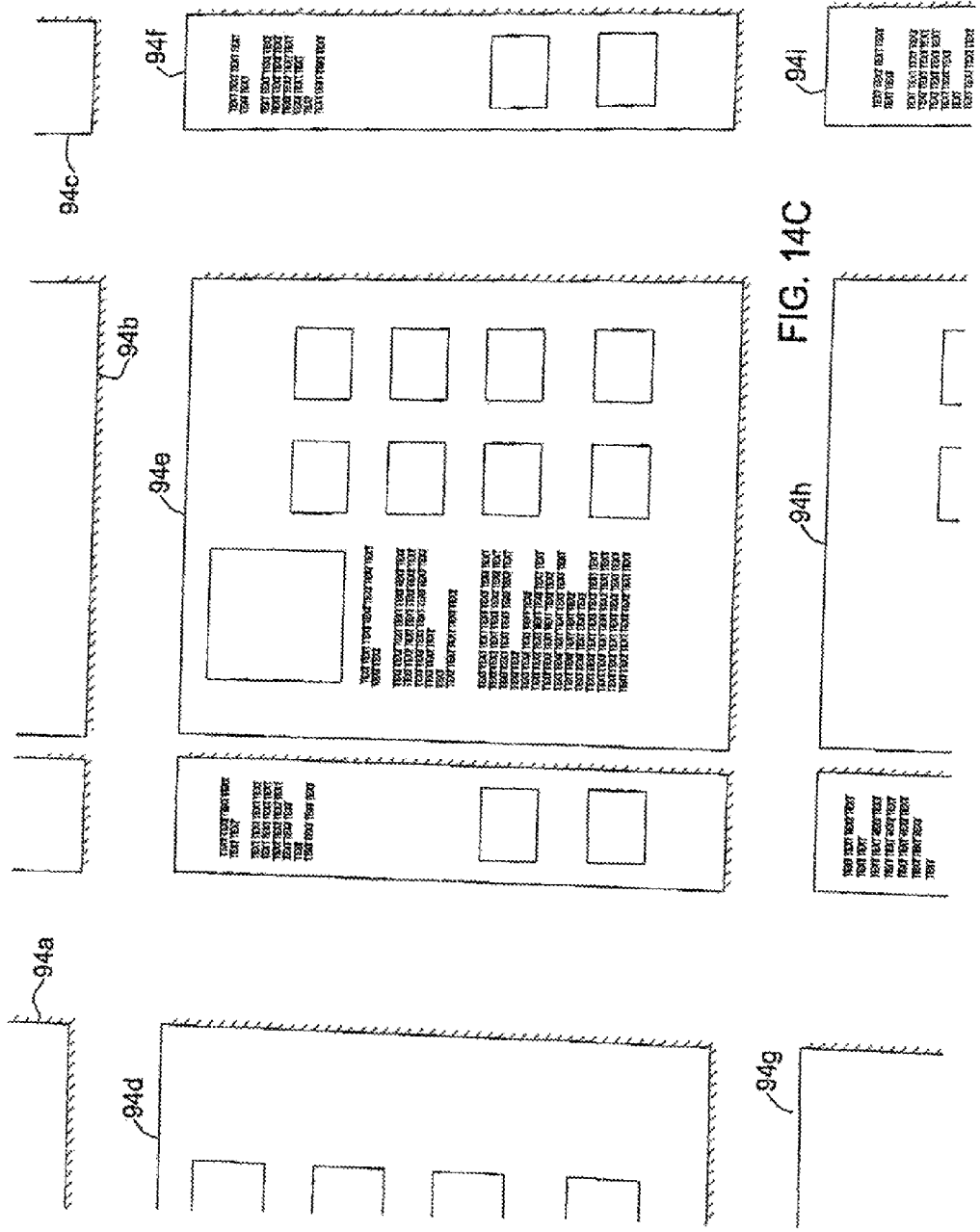
Figure 14D:
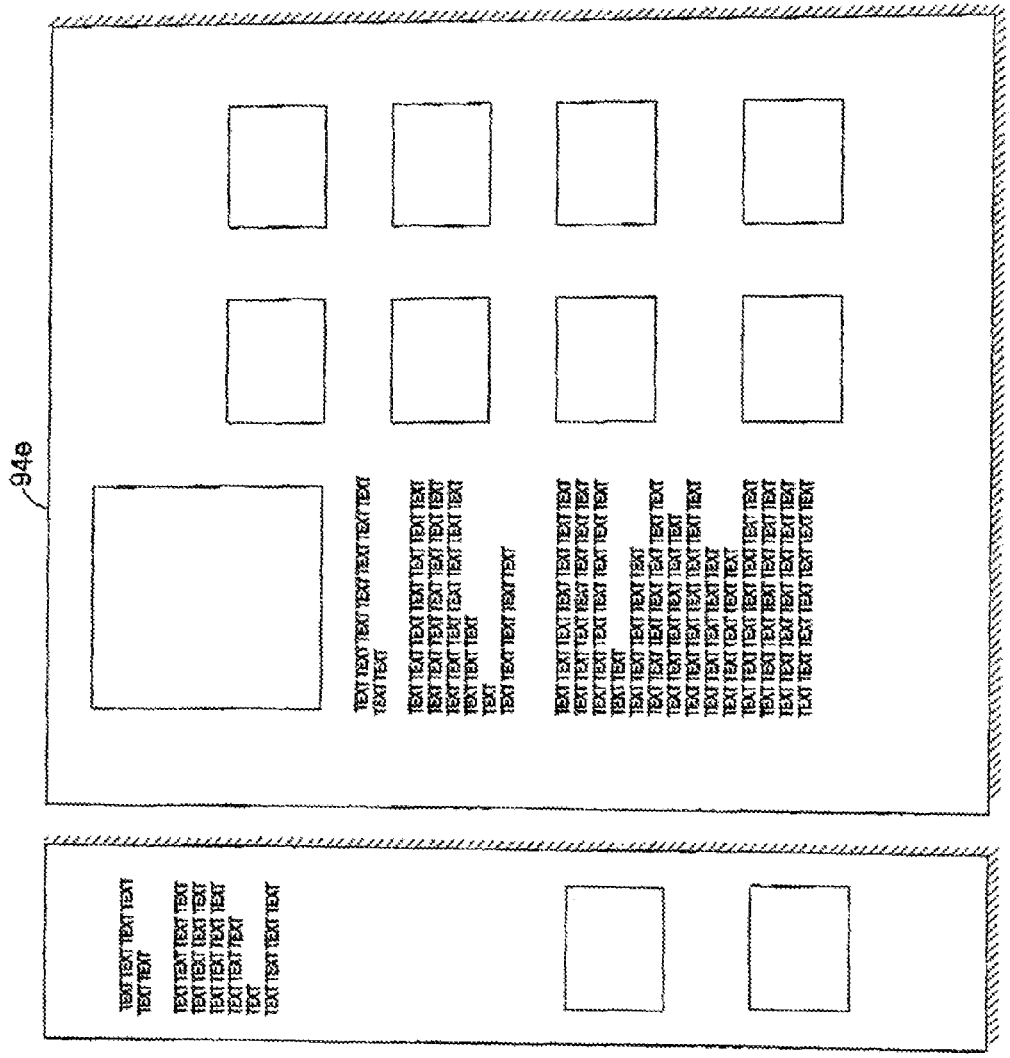

FIGS. 13a to 13e show changes in the view of the 3D space as the viewpoint remains fixed and the viewing angle is rotated in a plane perpendicular to the base plane. In FIG. 13a, the viewing ray is nearly perpendicular to the base plane. In FIGS. 13b and c the viewing ray intersects the base plane at a decreasing angle α (see FIG. 1). FIG. 14 shows a sequence of views zooming in on a page.

Figure 15:
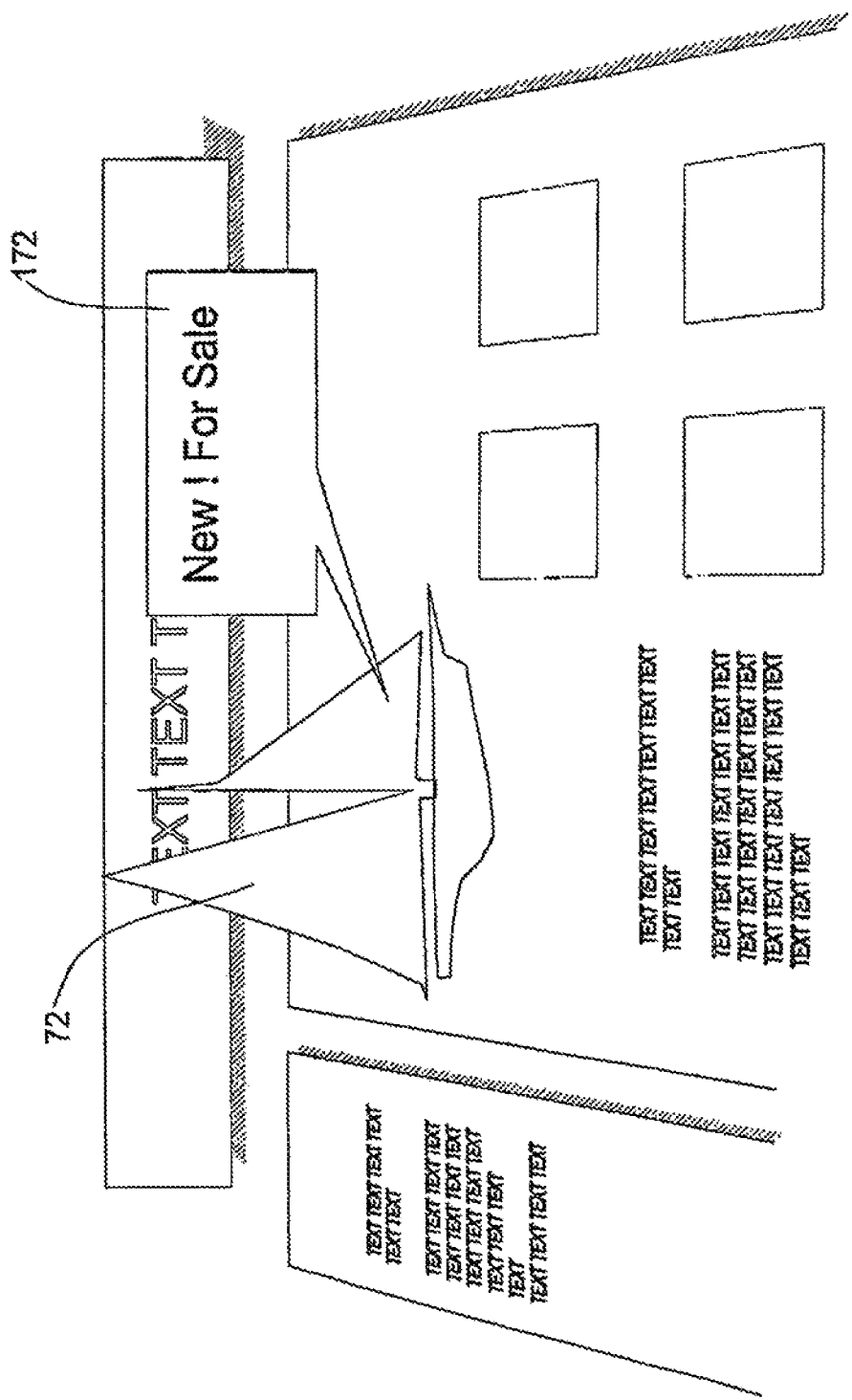
FIGS. 15 and 16 show use of accessory content items.
Figure 16:
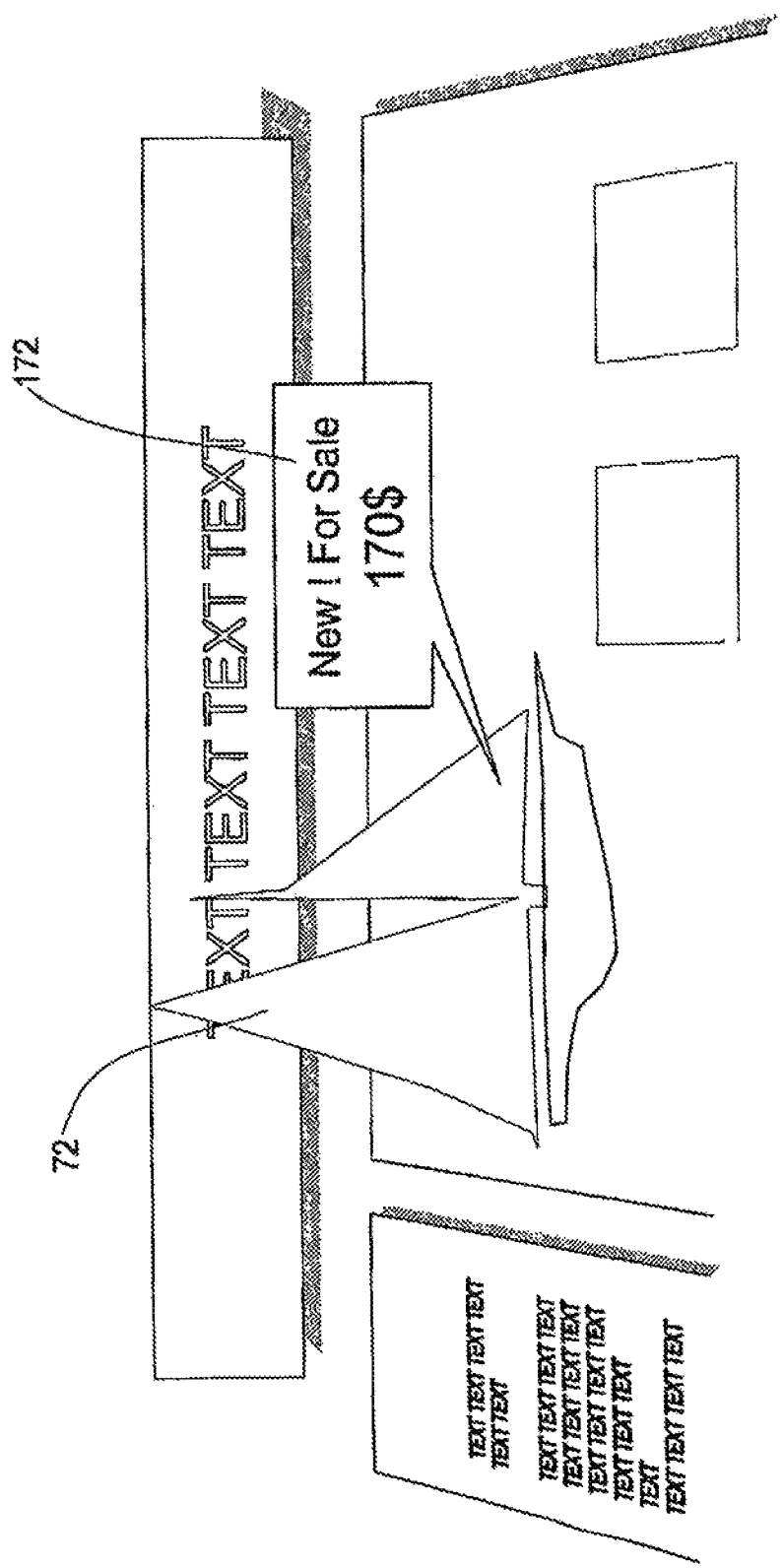

Interactivity may be enhanced by introducing accessories capable of performing a response when a predetermined condition is satisfied. For example, as shown in FIG. 15, an accessory 172 appear when the sailboat model 72 is to approached, which in this example is a content element providing additional information relating to the sailboat model 72. The accessory 172 may appear spontaneously when a condition is met. The condition may be, for example, that the distance between the viewpoint and the model 72 is less than a predetermined distance (indicating the user's interest in the model 72), when the user remains in close proximity to the sailboat model 72 for more than a predetermined amount of time, or when the model intersects a cone centered around the viewing ray having a particular apical angle. In FIG. 16 the accessory 172 has been modified by the addition of the price of the model 72. This change may arise interactively when a second condition is met. A content element may also perform a response when the user explicitly requests such a response using a computer input device, such as clicking on the element with a computer mouse.

Figure 17B:
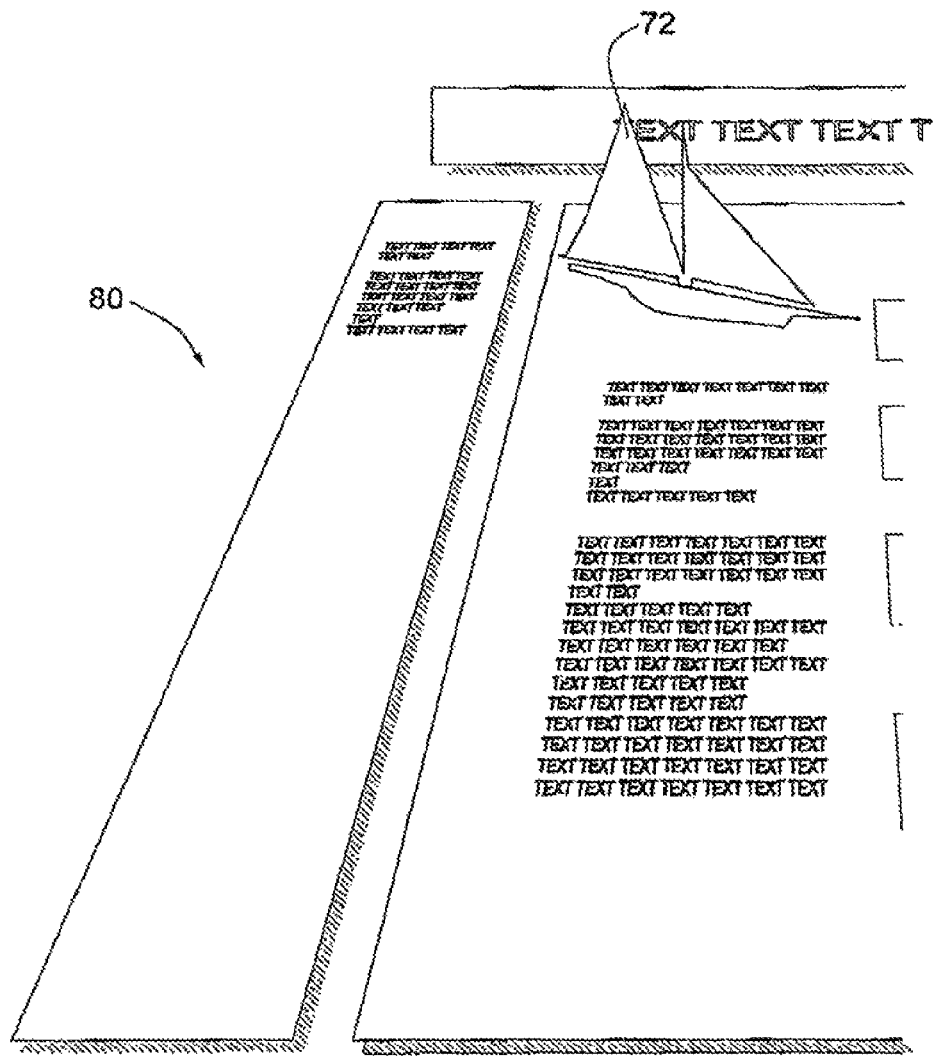
Figure 17C:
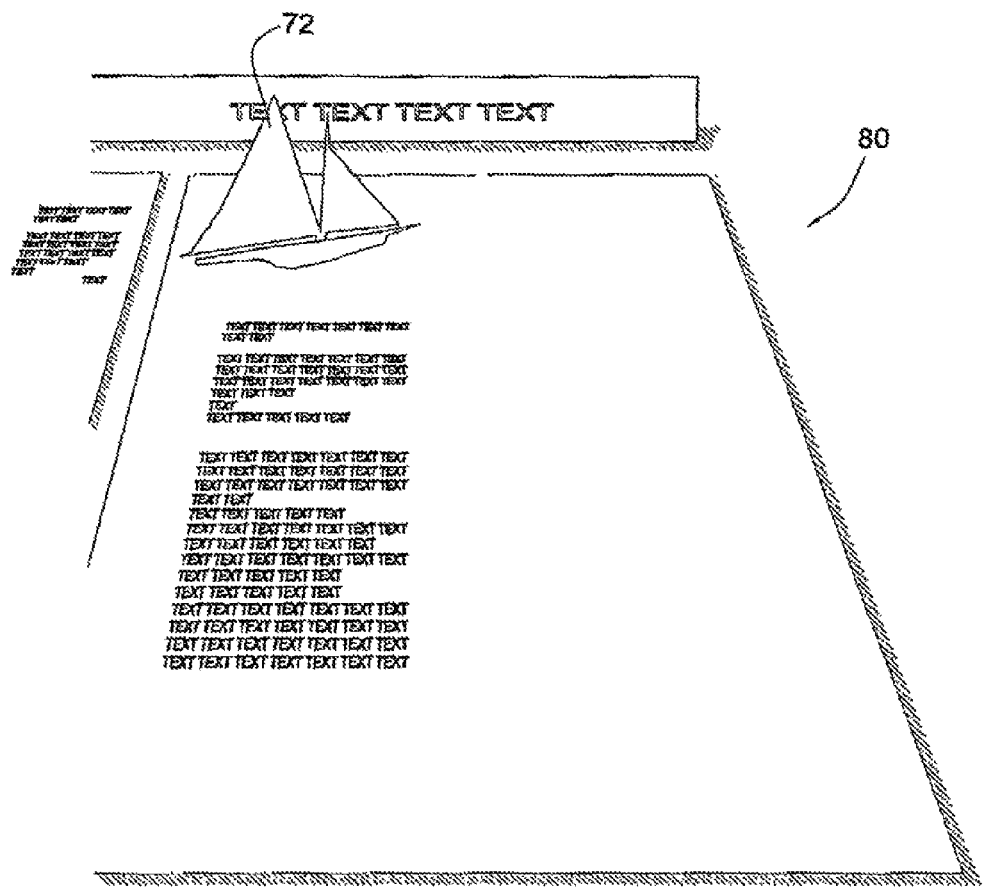

FIGS. 17a to 17c show another form of interactivity in which the sailboat model 72 rotates as the user passes the page 80 so that the sailboat model 72 is continuously viewed en face as the user passes the page 80.

Figure 18B:
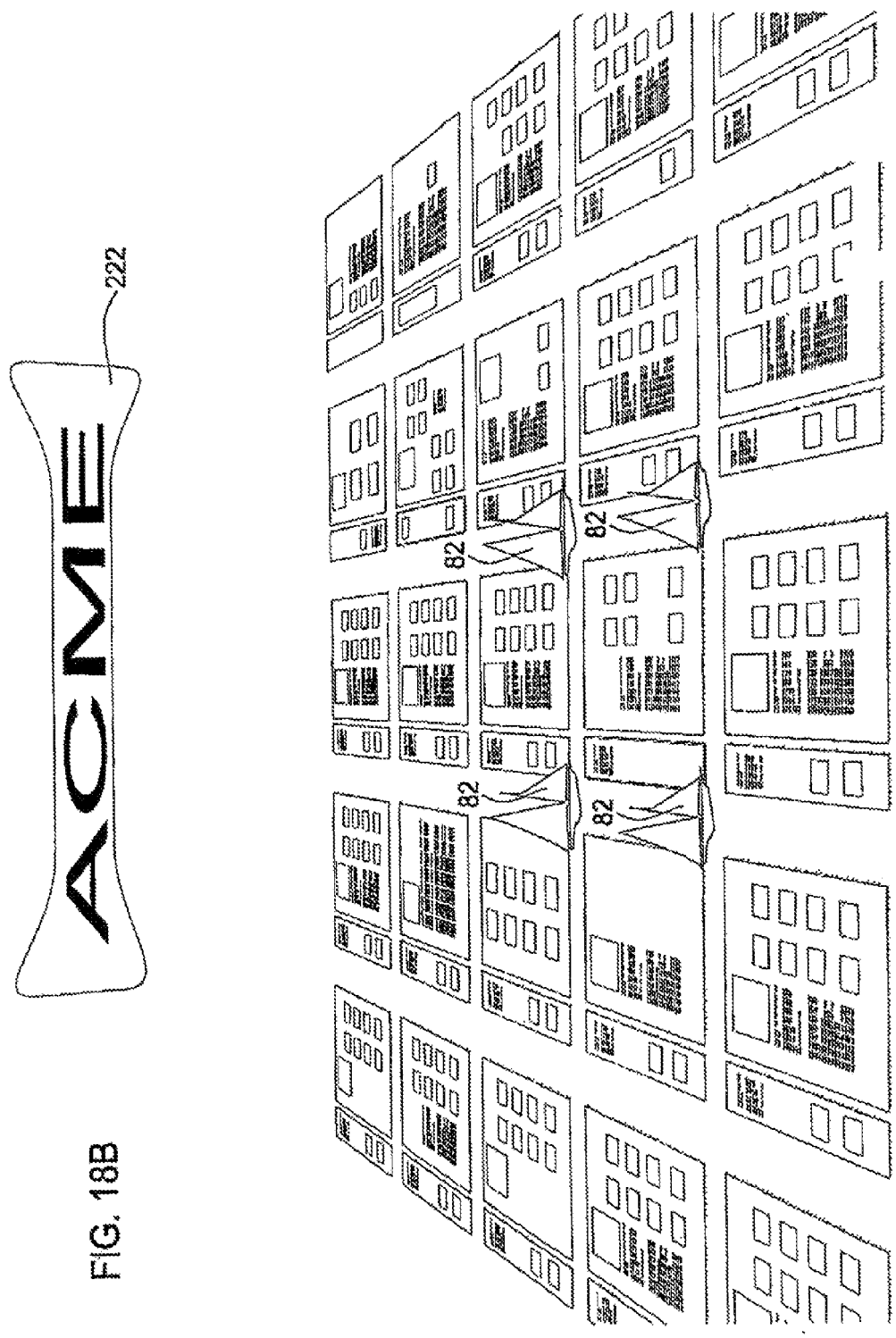

FIGS. 18a and b shows two views of the same scene of the 3D space after addition of site-wide information. The site-wide information includes the banner which may identify the subject or owner of the site. Several sailboat models have been added which may be, an element related to the site.

Figure 19:
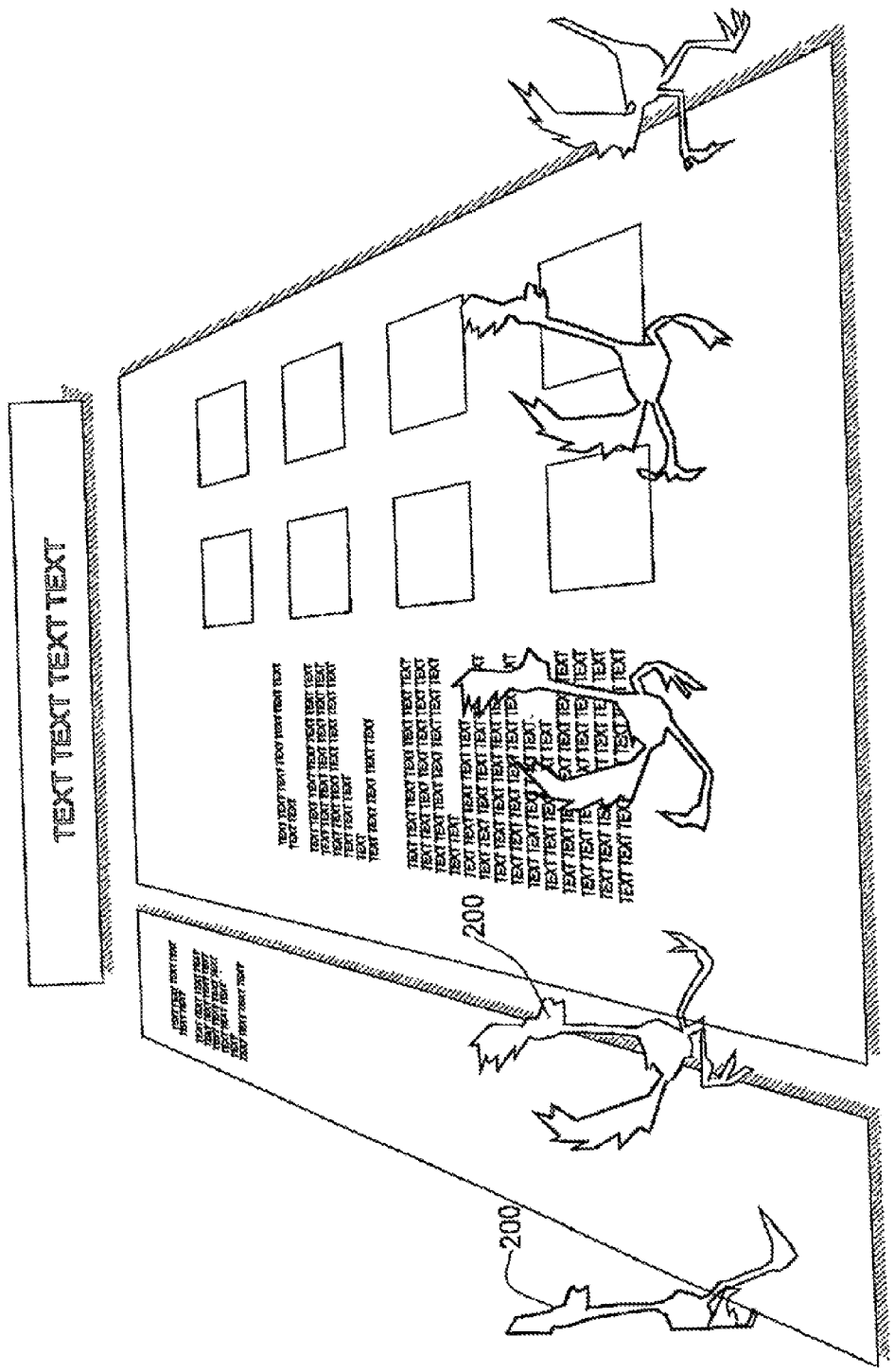
FIG. 19 shows an accessory 200 in the 3D space that is animated when a particular condition is met.

FIG. 19 shows an accessory 200 in the 3D space that is animated when a particular condition is met. A discrete sequence of the accessory's shape and position in the 3D space from its animated routine is shown in FIG. 19. The accessory may appear in the 3D space only when a condition is met, or it may be initially present and unanimated until a condition is satisfied. The animation may be accompanied by sound perceived by the user to be emanating from the accessory 200.

FIG. 20 shows another accessory 202 that has been positioned in the 3D space that serves as a guide to the site. The accessory 202 may move in the 3D space so as to follow the users movement in the space. Alternatively, several stationary copies the accessory 202 may positioned in the 3D space so as to be encountered by the user at a high frequency.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method implemented by a programmed computer, for displaying a projection of a virtual three-dimensional (3D) space via a display device, comprising:
   a) designating a 2D base plane in the virtual 3D space;
   b) positioning a first page and at least a second page or a content element in the 3D space with at least the first page parallel to the base plane, wherein each page is a 2D array of 2D and/or volumetric 3D content elements and each page has a layout;
   c) selecting a single viewpoint and a viewing ray extending from the viewpoint and intersecting the base plane at an angle between 0 and 90°;
   d) positioning a first planar 2D surface in the 3D space at a predetermined distance from the viewpoint, so that the first planar 2D surface intersects the viewing ray between the viewpoint and the base plane so as to define a viewing frustum, within which is a viewing space, wherein the viewing space contains at least a portion of the first page and at least a portion of the second page or content element;
   e) projecting the entire viewing space onto the first planar 2D surface using a single perspective projection determined by the viewing ray, such that for every point in the viewing space that is projected onto a corresponding point on the first 2D surface, that point of the viewing space, the corresponding point projected onto the first 2D surface, and the viewpoint are collinear;
   f) optionally projecting the single perspective projection on the first 2D surface onto a second 2D surface; and
   g) displaying the first 2D planar surface or the second 2D surface via a display device.

2. The method according to claim 1 including said step f) of projecting the projection on the first 2D surface onto a second 2D surface, the second 2D surface being a flat surface, a spherical surface, a cylindrical surface, or an irregular surface, and said displaying step comprises displaying the second 2D surface via the display device.

3. The method according to claim 1 wherein in step b), two adjacent pages are separated from each other in the base plane.

4. The method according to claim 2, wherein in step b), two adjacent pages are separated from each other in the base plane.

5. The method according to claim 1, wherein at least one page contains at least one 3D volumetric content element.

6. The method according to claim 1, further comprising a step of parsing a page into content elements and repositioning one or more of the content elements in the 3D space.

7. The method according to claim 6, wherein and the page's content elements are repositioned in the 3D space so as to preserve the layout.

8. The method according to claim 6, wherein a content element is repositioned in the base plane next to the page.

9. The method according to claim 7, wherein a content element is repositioned in the base plane next to the page.

10. The method according to claim 6, wherein a content element is repositioned out of the base plane.

11. The method according to claim 10, wherein a 2D content element is positioned parallel to the base plane.

12. The method according to claim 10, wherein a 2D content element is repositioned so that it projects from the base plane.

13. The method according to claim 7, wherein a content element is repositioned out of the base plane.

14. The method according to claim 13, wherein a 2D content element is positioned parallel to the base plane.

15. The method according to claim 13, wherein a 2D content element is repositioned so that it projects from the base plane.

16. The method according to claim 1, further comprising a step of positioning in 3D space one or more additional content elements.

17. The method according to claim 16, wherein one or more of the additional content elements are advertising.

18. The method according to claim 17, wherein a content element is positioned equidistantly between two pages.

19. The method according to claim 17, wherein a content element is positioned between two adjacent pages closer to one of the pages than the other.

20. The method according to claim 1, wherein a content element executes a response when the viewing ray satisfies a predetermined condition.

21. The method according to claim 20, wherein the predetermined condition is selected from the group comprising:
   (h) a distance from the viewpoint to the content element is less than a predetermined distance;
   (i) the content element intersects a cone centered around the viewing ray having a vertex at the viewpoint and a predetermined apical angle;
   (j) the content element intersects a cone centered around the viewing ray having a vertex at the viewpoint and a predetermined apical angle as the viewpoint moves towards the content element;
   (k) the content element intersects a cone centered around the viewing ray having a vertex at the viewpoint and a predetermined apical angle as the viewpoint moves away from the content element;
   (l) the content element intersects a cone centered around the viewing ray having a vertex at the viewpoint and a predetermined apical angle as the viewpoint accelerates or decelerates;
   (m) the viewpoint passes by the content element;
   (n) the user requests a response from a content element using a computer input device.

22. The method according to claim 20, wherein the response is selected from the group consisting of:
   the content element becomes animated;
   the content element is repositioned; and
   the content element issues sounds.

23. The method according to claim 21, wherein the response is selected from the group consisting of:
   the content element becomes animated;
   the content element is repositioned; and
   the content element issues sounds.

24. The method according to claim 1, wherein said step (f) is not present and said displaying step comprises displaying the first 2D surface via the display device.

25. The method according to claim 24, wherein the display device is a computer monitor, a television, or a set-top box.

26. The method according to claim 24, wherein the display device is remotely located.

27. The method according to claim 1, further comprising:
   (h) designating one or more planes in the 3D space in addition to the base plane, the additional planes being parallel to the base plane; and
   (i) positioning one or more pages or content elements in the additional planes.

28. The method according to claim 27, further comprising:
   (j) selecting a plane from among the base plane and the additional planes; and removing the other planes from the 3D space; and
   (k) projecting at least a portion of the 3D space onto the 2D surface by a perspective projection determined by the viewing ray.

29. The method according to claim 1, wherein at least one page is an application window.

30. The method according to claim 29, wherein the window contains a content element that is at least a portion of a document page.

31. The method according to claim 1, further comprising a step of designating in the base plane one or more regions for positioning a page and/or content element.

32. The method according to claim 1, further comprising a step of replacing a page or a content element in the base plane when a distance between the viewpoint and the page or content element is greater than a predetermined distance.

33. The method according to claim 1, wherein the base plane is subdivided into content areas by a grid.

34. The method according to claim 33, wherein the grid designates areas in the base plane for one or more pages, areas surrounding pages, or areas between the designated areas surrounding pages.

35. The method according to claim 1, wherein one or more of the pages are results of a search query.

36. The method according to claim 1, wherein a first content element is positioned between a second content element and a third content element in a different page.

37. The method according to claim 1, further comprising transmitting content elements or pages with their positions in the 3D space to a local disk or a remote location.

38. The method according to claim 1, further comprising repeating said steps (c)-(g) at least once, each time optionally selecting a new viewpoint and/or selecting a new viewing ray and/or altering a property of one or more content elements or one or more pages in the 3D space.

39. The method according to claim 1, wherein the first 2D surface is a flat surface, a spherical surface, a cylindrical surface, or an irregular surface.

40. A computer readable non-transitory medium encoded with computer program code for performing all the steps of claim 1 when said program code is executed on a computer processor.

41. A system for displaying a projection of a virtual three-dimensional (3D) space via a display device, comprising:
   a computer processor configured to
   (a) designate a 2D base plane in the virtual 3D space;
   (b) position a first page and at least a second page or a content element in the 3D space with at least one page parallel to the base plane, wherein each page is a 2D array of 2D and/or volumetric 3D content elements and each page has a layout;
   (c) select a single viewpoint and a viewing ray extending from the viewpoint and intersecting the base plane at an angle between 0 and 90°;
   (d) position a first planar 2D surface in the 3D space at a predetermined distance from the viewpoint, so that the first planar 2D surface intersects the viewing ray between the viewpoint and the base plane so as to define a viewing frustum, within which is the viewing space, wherein a viewing space contains at least a portion of the first page and at least a portion of the second page or content element;

(e) project the entire viewing space onto the first planar 2D surface using a single perspective projection determined by the viewing ray such that for every point in the viewing space that is projected onto a corresponding point on the first 2D surface, that point of the viewing space, the corresponding point projected onto the first 2D surface, and the viewpoint are collinear; and (f) optionally project the single perspective projection on the first 2D surface onto a second 2D surface; and (g) display the first 2D surface or the second 2D surface via the display device.

42. The system according to claim 41, wherein said computer processor is configured to execute the step f) of projecting the projection on the first 2D surface onto a second 2D surface, wherein the second 2D surface is a flat surface, a spherical surface, a cylindrical surface, or an irregular surface, and said computer processor displays the second 2D surface via the display device.

43. The system according to claim 41, wherein two adjacent pages are separated from each other in the base plane.

44. The system according to claim 41, wherein at least one page contains at least one 3D volumetric content element.

45. The system according to claim 41, wherein the computer processor is further configured to parse a page into content elements and reposition one or more of the content elements in the 3D space.

46. The system according to claim 45, wherein and the computer processor is further configured to reposition a page's content element so as to preserve the page's layout.

47. The system according to claim 45, wherein the computer processor is further configured to reposition a content element in the base plane next to the page.

48. The system according to claim 45, wherein the computer processor is further configured to reposition a content element out of the base plane.

49. The system according to claim 48, wherein the computer processor is further configured to position a 2D content element parallel to the base plane.

50. The system according to claim 48, wherein the computer processor is further configured to reposition a 2D content element so that it projects from the base plane.

51. The system according to claim 41, wherein the computer processor is further configured to position in the 3D space one or more additional content elements.

52. The system according to claim 51, wherein one or more of the additional content elements are advertising.

53. The system according to claim 52, wherein a content element is positioned equidistantly between two pages.

54. The system according to claim 52, wherein a content element is positioned between two adjacent pages closer to one of the pages than the other.

55. The system according to claim 41, wherein a content element executes a response when the viewing ray satisfies a predetermined condition.

56. The system according to claim 55, wherein the predetermined condition is selected from the group comprising:

(h) a distance from the viewpoint to the content element is less than a predetermined distance;

(i) the content element intersects a cone centered around the viewing ray having a vertex at the viewpoint and a predetermined apical angle;

(j) the content element intersects a cone centered around the viewing ray having a vertex at the viewpoint and a predetermined apical angle as the viewpoint moves towards the content element;

(k) the content element intersects a cone centered around the viewing ray having a vertex at the viewpoint and a predetermined apical angle as the viewpoint moves away from the content element;

(l) the content element intersects a cone centered around the viewing ray having a vertex at the viewpoint and a predetermined apical angle as the viewpoint accelerates or decelerates;

(m) the viewpoint passes by the content element; and (n) the user requests a response from a content element using a computer input device.

57. The system according to claim 55, wherein the response is selected from the group consisting of:
the content element becomes animated;
the content element is repositioned; and
the content element issues sounds.

58. The system according to claim 56, wherein the response is selected from the group consisting of:
the content element becomes animated;
the content element is repositioned; and
the content element issues sounds.

59. The system according to claim 41, wherein said step (f) is not present and said computer processor displays the first 2D surface via the display device.

60. The system according to claim 59, wherein the display device is a computer monitor, a television, or a stereo viewer.

61. The system according to claim 59, wherein the display device is remotely located.

62. The system according to claim 60, wherein the display device is remotely located.

63. The system according to claim 41, wherein the first 2D surface is a flat surface, a spherical surface, a cylindrical surface, or an irregular surface.

64. A computer readable non-transitory medium encoded with a computer program code for performing the following computer processor tasks when said program code is executed by a computer processor:

(a) designate a 2D base plane in the virtual three-dimensional (3D) space;

(b) position a first page and at least a second page or a content element in the 3D space with at least one page parallel to the base plane, wherein each page is a 2D array of 2D and/or volumetric 3D content elements and each page has a layout;

(c) select a single viewpoint and a viewing ray extending from the viewpoint and intersecting the base plane at an angle between 0 and 90°;

(d) position a first planar 2D surface in the 3D space at a predetermined distance from the viewpoint, so that the first planar 2D surface intersects the viewing ray between the viewpoint and the base plane so as to define a viewing frustum, within which is the viewing space, wherein a viewing space contains at least a portion of the first page and at least a portion of the second page or content element;

(e) project the entire viewing space onto the first planar 2D surface using a single perspective projection determined by the viewing ray such that for every point in the viewing space that is projected onto a corresponding point on the first 2D surface, that point of the viewing space, the corresponding point projected onto the first 2D surface, and the viewpoint are collinear; and (f) optionally project the single perspective projection on the first 2D surface onto a second 2D surface; and (g) display the first 2D surface or the second 2D surface via the display device.

65. The method according to claim 40, further comprising repeating said steps (c)-(g) at least once, each time optionally selecting a new viewpoint and/or selecting a new viewing ray and/or altering a property of one or more content elements or one or more pages in the 3D space.

66. The system according to claim 65, wherein a content element executes a response when the viewing ray or the viewpoint satisfies a predetermined condition.

67. The method according to claim 38, wherein a content element executes a response when the viewing ray or the viewpoint satisfies a predetermined condition.

* * * * *